United States Patent
Suzuki et al.

(10) Patent No.: US 7,813,553 B2
(45) Date of Patent: Oct. 12, 2010

(54) IMAGE REGION DETECTION METHOD, RECORDING MEDIUM, AND DEVICE THEREFOR

(75) Inventors: Genta Suzuki, Kawasaki (JP); Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 838 days.

(21) Appl. No.: 11/740,627

(22) Filed: Apr. 26, 2007

(65) Prior Publication Data
US 2008/0075392 A1    Mar. 27, 2008

(30) Foreign Application Priority Data
Sep. 27, 2006  (JP) ............... 2006-263334

(51) Int. Cl.
*G06K 9/46* (2006.01)
(52) U.S. Cl. ............... 382/190; 382/199; 382/202; 382/203
(58) Field of Classification Search ............... 382/190, 382/199, 203, 173, 202
See application file for complete search history.

(56) References Cited

U.S. PATENT DOCUMENTS

| | | | |
|---|---|---|---|
| 6,049,636 A * | 4/2000 | Yang | 382/289 |
| 6,738,154 B1 | 5/2004 | Venable | |
| 6,853,751 B1 * | 2/2005 | Milligan et al. | 382/199 |
| 2002/0154121 A1 | 10/2002 | Ogawa et al. | |
| 2003/0095709 A1 | 5/2003 | Zhou | |
| 2004/0012679 A1 | 1/2004 | Fan | |
| 2004/0165786 A1 | 8/2004 | Zhang et al. | |
| 2005/0207652 A1 * | 9/2005 | Albertelli et al. | 382/199 |
| 2005/0226534 A1 | 10/2005 | Moroo et al. | |
| 2008/0170784 A1 * | 7/2008 | Guerzhoy et al. | 382/173 |

FOREIGN PATENT DOCUMENTS

| | | |
|---|---|---|
| JP | 2005-182164 | 7/2005 |
| JP | 2005-277732 | 10/2005 |
| WO | 98/31136 | 7/1998 |

OTHER PUBLICATIONS

Extended European Search Report issued in corresponding European Patent Application No. 07106459.6; dated May 29, 2008.

* cited by examiner

*Primary Examiner*—Jon Chang
(74) *Attorney, Agent, or Firm*—Staas & Halsey LLP

(57) ABSTRACT

Using an image region detection method according to the present invention, the detection of sides in the four directions (vertical and horizontal directions) is performed on the basis of results of edge detection performed on lines having a particular width, starting from an inner point toward the periphery of the quadrangular region in an input image, and the shape and the four corners of the quadrangle formed by the detected four sides are verified. Thereby, when there is a side that has been falsely detected, redetection on sides that are closer to the periphery than the side that has been detected falsely is performed, such that the quadrangular region can be formed at high speed.

20 Claims, 22 Drawing Sheets

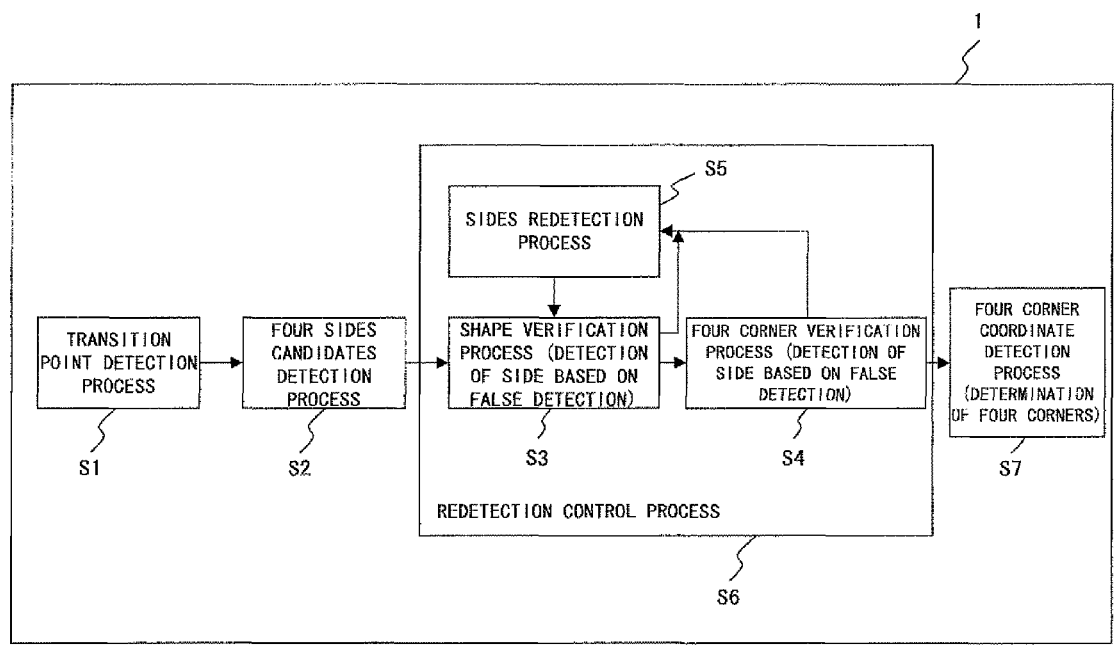
F I G. 1

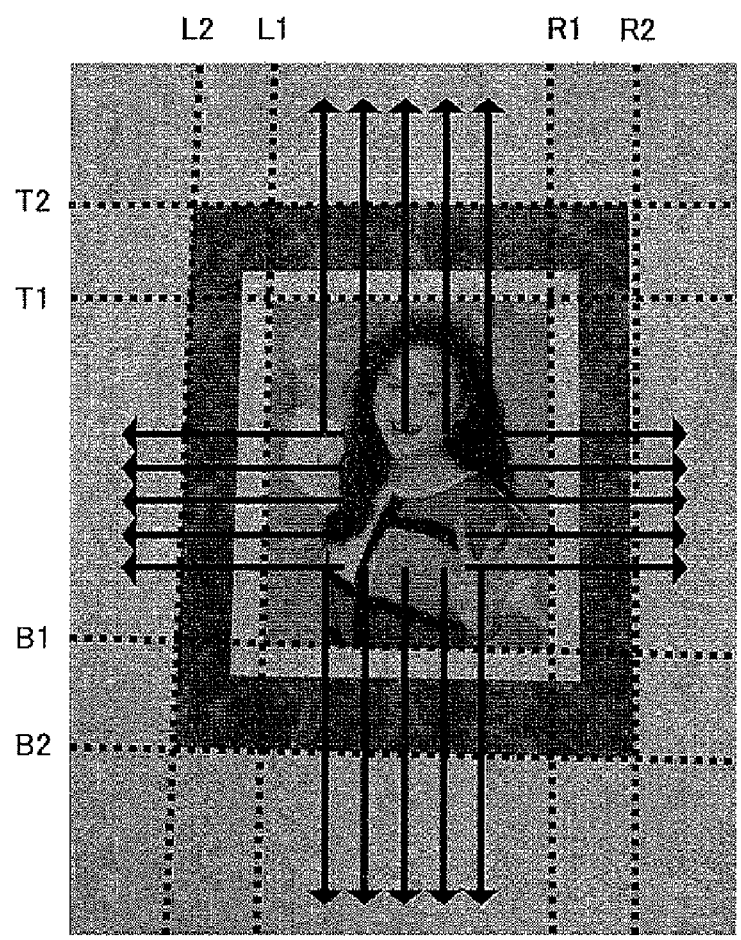
F I G. 4 A

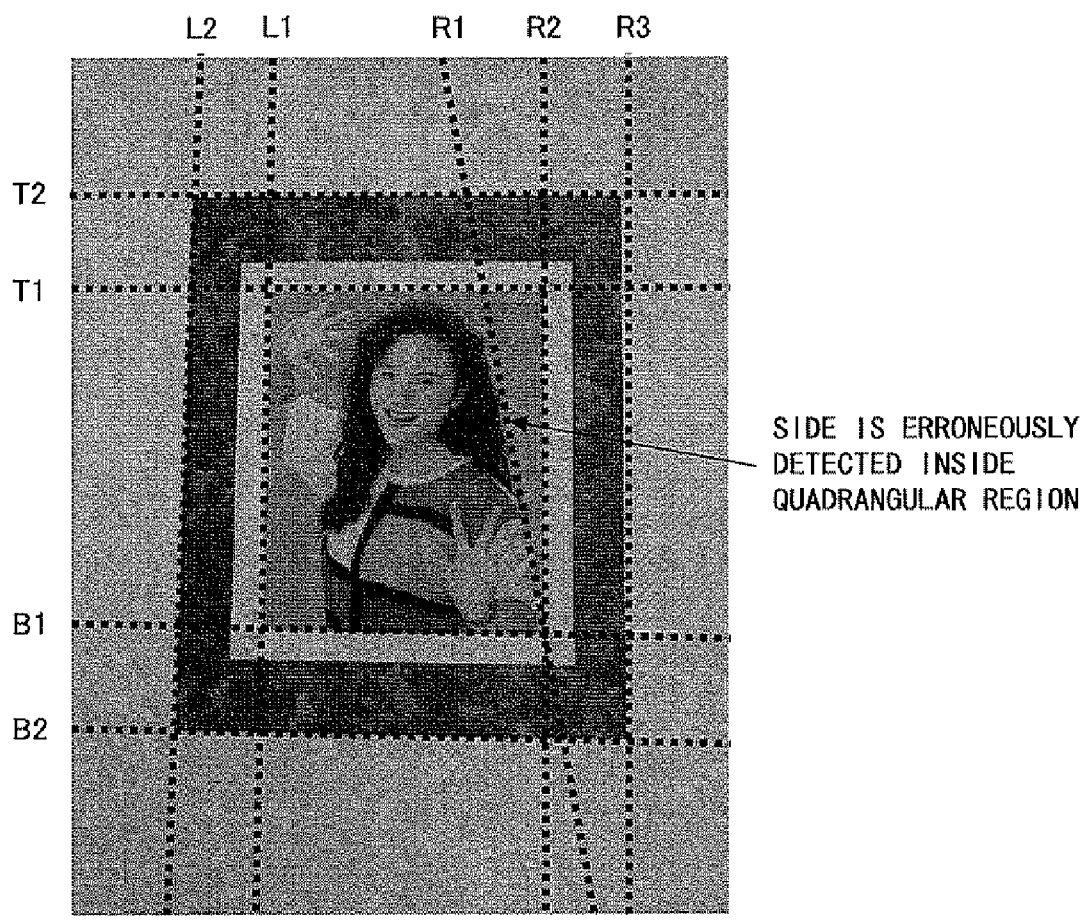
F I G. 5

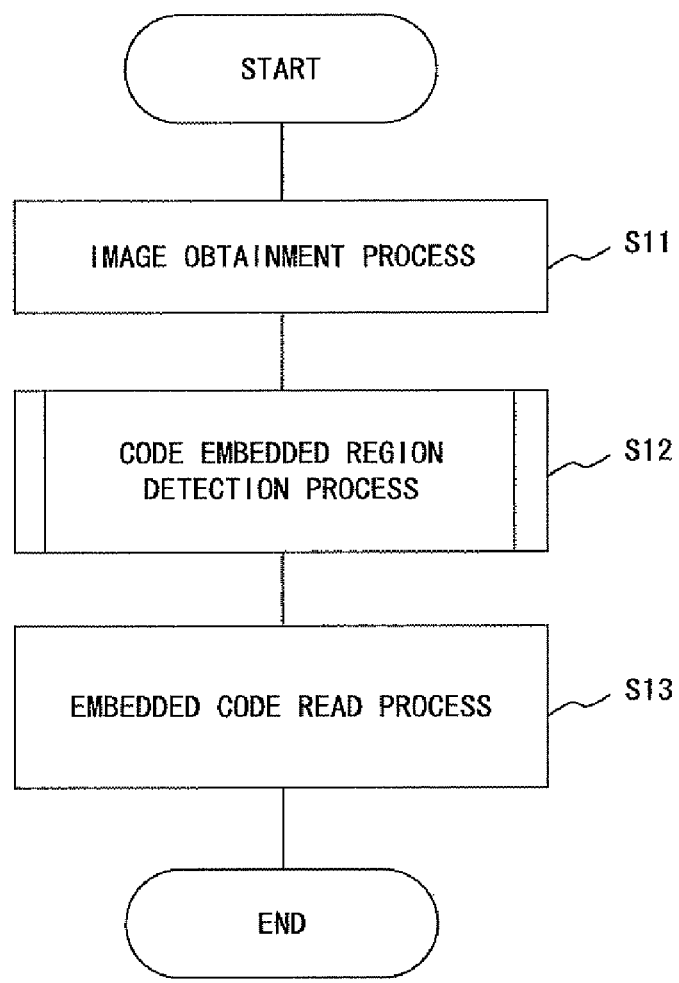
F I G. 6

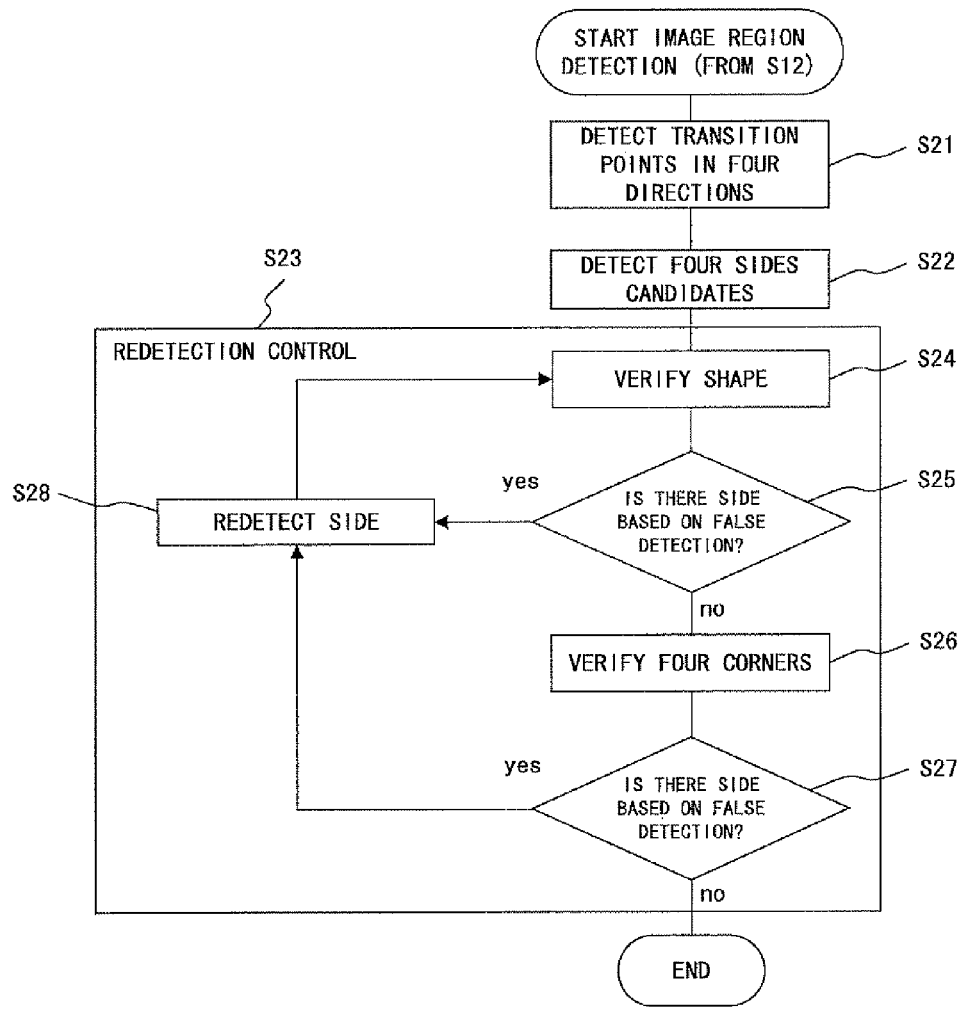
F I G. 7

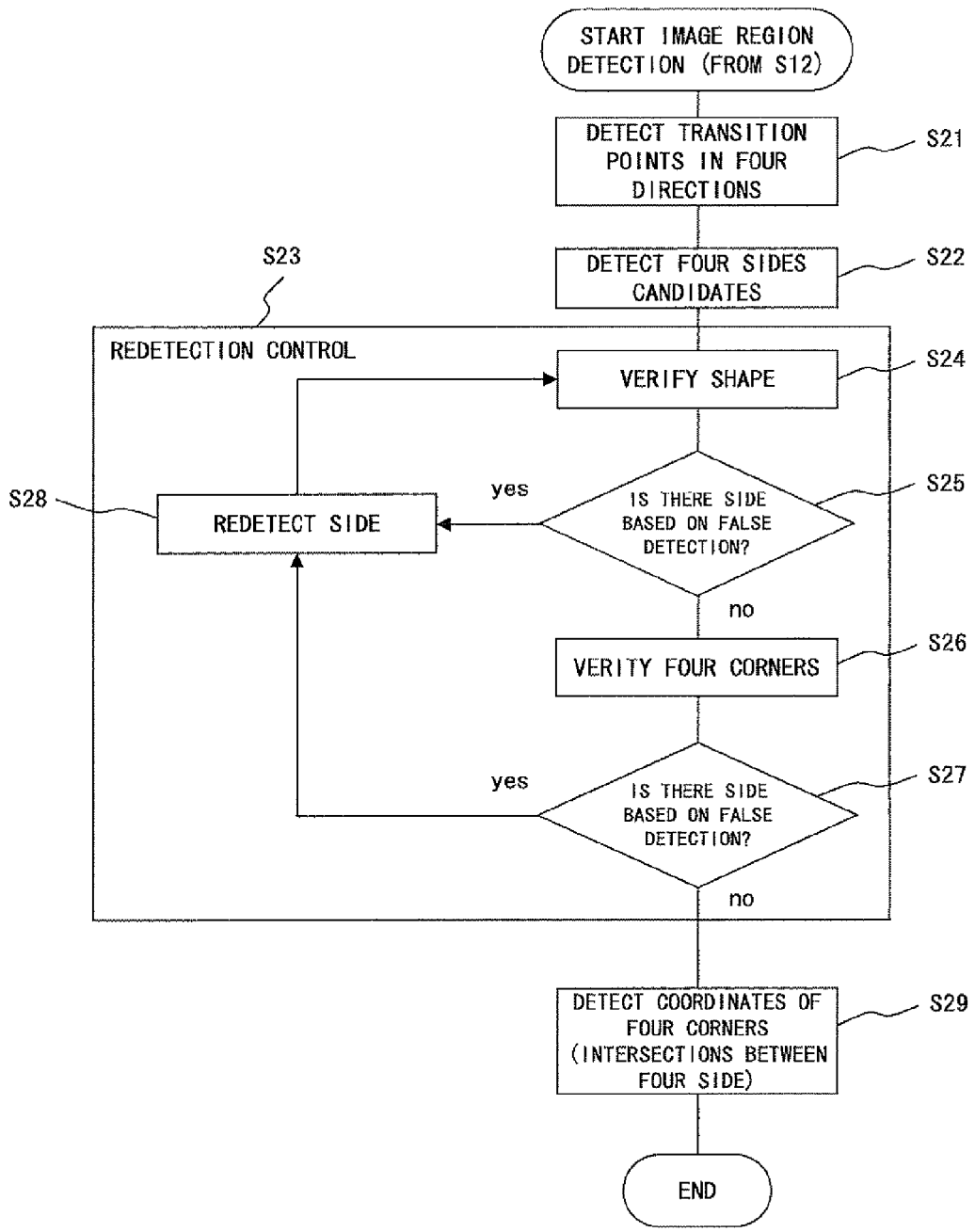
F I G. 8

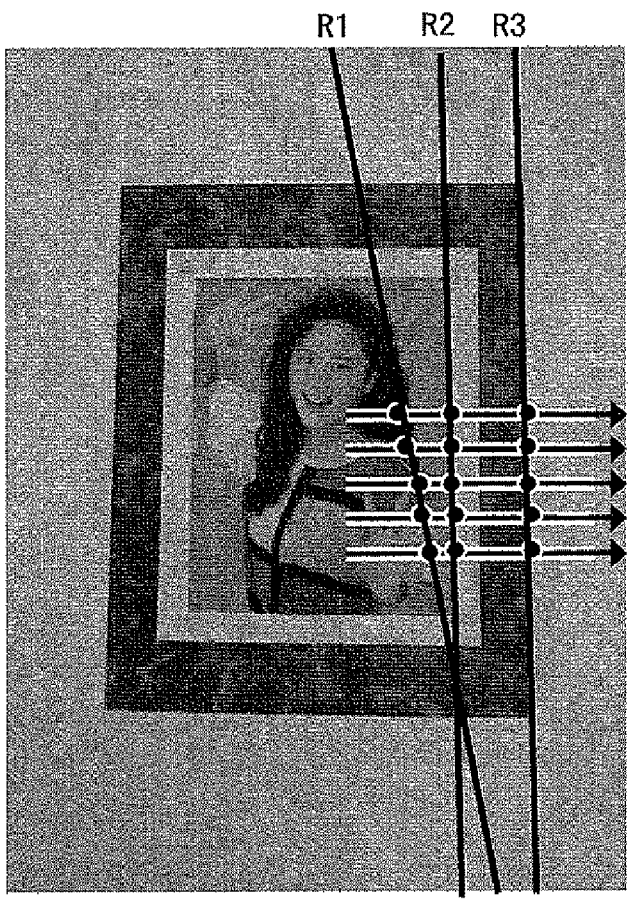
● EDGES AT WHICH PIXEL VALUES TRANSIT FROM DARK TO BRIGHT
F I G. 11

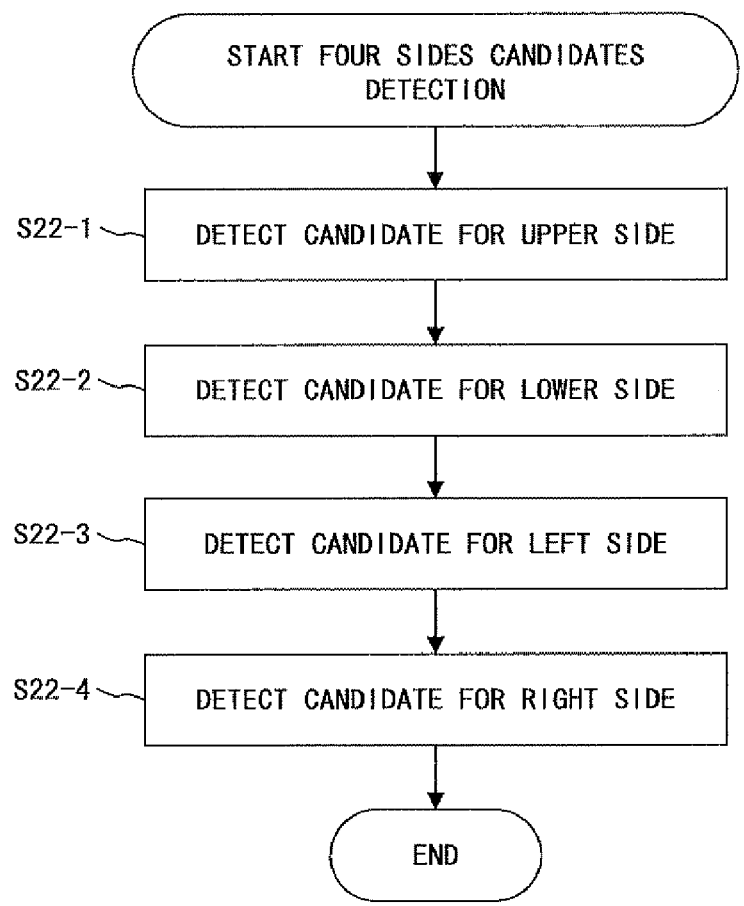
F I G. 1 2

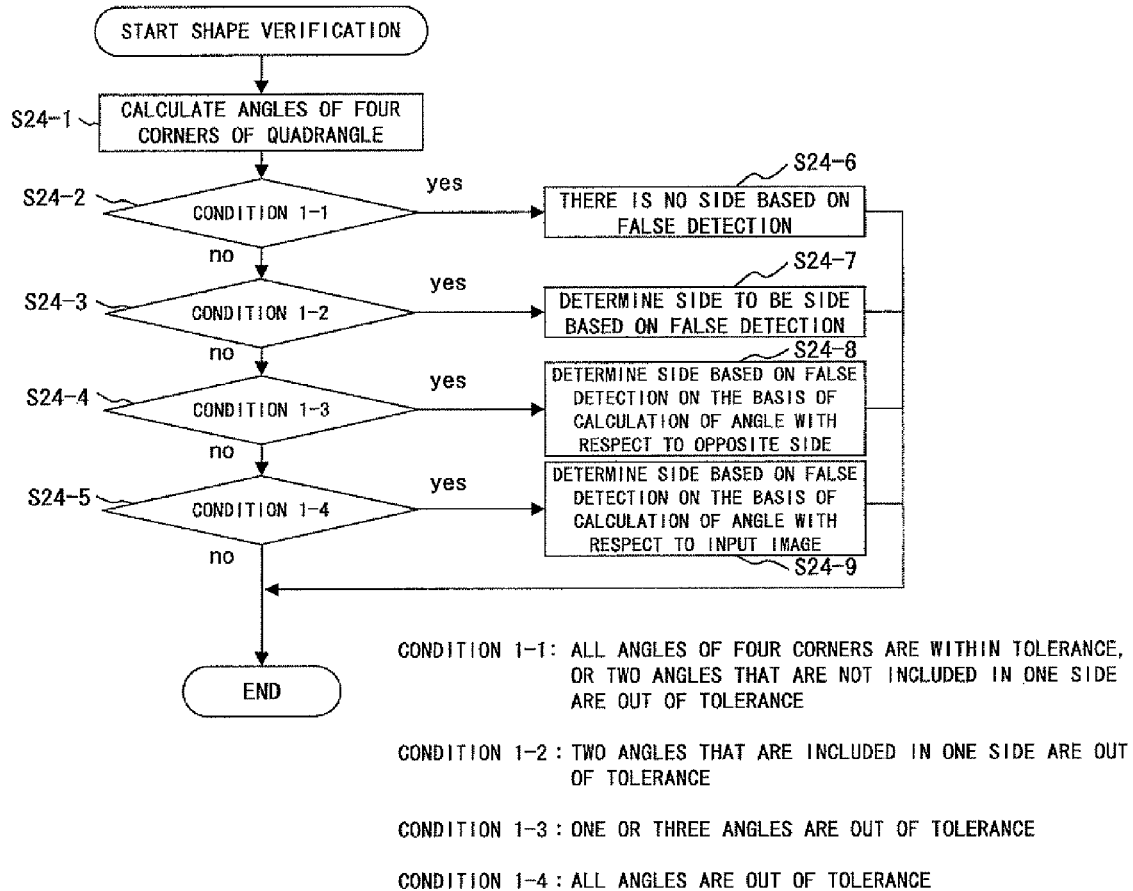
F I G. 15

CROSS

ENLARGED VIEW OF CROSS AT UPPER LEFT CORNER

IMAGE REGION DETECTION METHOD, RECORDING MEDIUM, AND DEVICE THEREFOR

CROSS REFERENCE TO RELATED APPLICATIONS

The present application claims priority to Japanese Patent Application No. 2006-26334, filed Sep. 27, 2006, the entire contents of which are hereby incorporated herein by reference.

BACKGROUND OF THE INVENTION

1. Field of the Invention

The present invention relates to an image region detection technique for inputting, through an image input device, a printed image that includes an image in which prescribed codes are embedded, and detecting, on the input image, a quadrangular region in which the codes are embedded.

2. Description of the Related Art

In recent years, techniques of embedding invisible codes in digital data or in printed images have been developed. In order to read code information from input images in which prescribed codes (simply referred to as "codes", hereinafter) are embedded (the input images having been photographed by using image input devices such as cameras or scanners included in mobile phones), the coordinates of the four corners of the quadrangular region in which the codes are embedded are determined, and decoding is performed on the basis of the determined coordinates of the four corners.

In the conventional image region detection methods for detecting the coordinates of four corners (such as those disclosed in, for example, Japanese Patent Application Publication Nos. 2005-277732 and 2005-182164), the detection is performed in such a manner that the initial coordinates from which the image region detection starts are set in the peripheral area of the input image, and the sides of the quadrangular region are thus detected; thereafter, the coordinates of the four corners are obtained to be used for the region detection.

In the conventional technique of detecting the four corners of the quadrangular region, searches for the sides of the quadrangular region have been performed from the peripheral area of the input image. Thus, when there is another quadrangular region that includes the quadrangular region that has to be detected, this other, outer quadrangular region is detected, and the inner quadrangular region that has to be detected is not detected, which has been problematic.

SUMMARY OF THE INVENTION

It is an object of the present invention to properly detect a quadrangular region even when the quadrangular region is enclosed by another quadrangular region. It is another object of the present invention to allow devices of low processing capacity, such as mobile terminals, to detect the coordinates of the four corners at high speed.

The image region detection method for detecting a quadrangular region in a second image, the second image being obtained by photographing a quadrangular first image, and the second image including the quadrangular region that is an image region corresponding to the first image in the present invention, comprises:

detecting one pixel, as a transition point, when a difference in pixel values between adjacent pixels exceeds a threshold value while scanning toward a periphery of the second image from a plurality of pixels set as initial points positioned within a certain range from a center of the second image;

creating sides of a quadrangle in respective combinations on the basis of transition points on the assumption that there is a combination of transition points obtained in a one-by-one manner from respective transition point detection lines that are oriented in the same direction and that are members of a group of transition point detection lines that are based on the transition point detection performed in four directions on the second image, the four directions being the two vertical and the two horizontal directions, and detecting as candidates for sides of the quadrangle, from among the sides created in the respective directions, those sides that are closest to the initial points; and determining, on the basis of a quadrangle formed by the four candidate sides that have been detected, whether or not a detected side is a side that has been detected falsely, and performing redetection of candidates for sides when the side is confirmed to be a side that has been detected falsely.

The recording medium that records an image region detection program for causing a computer to execute a process for detecting a quadrangular region on a second image, the second image being obtained by photographing a quadrangular first image and the second image including the quadrangular region that is an image region corresponding to the first image in the present invention, comprises:

a transition point detection process for detecting one pixel, as a transition point, when a difference in pixel values between adjacent pixels exceeds a threshold value while scanning toward a periphery of the second image from a plurality of pixels set as initial points positioned within a certain range from a center of the second image;

a four-sides-candidates detection process for creating sides of a quadrangle in respective combinations on the basis of transition points on the assumption that there is a combination of transition points obtained in a one-by-one manner from respective transition point detection lines that are oriented in the same direction and that are members of a group of transition point detection lines that are based on the transition point detection performed in four directions on the second image, the four directions being the two vertical and the two horizontal directions, and detecting as candidates for sides of the quadrangle, from among the sides created in the respective directions, those sides that are closest to the initial points; and a side redetection control process for determining, on the basis of a quadrangle formed by the four candidate sides that have been detected, whether or not a detected side has been detected falsely, and performing redetection of candidates for sides when the side is confirmed to be a side that has been detected falsely.

The image region detection device for detecting a quadrangular region in a second image, the second image being obtained by photographing a quadrangular first image, and the second image including the quadrangular region that is an image region corresponding to the first image in the present invention, comprises:

a transition point detection unit for detecting one pixel, as a transition point, when a difference in pixel values between adjacent pixels exceeds a threshold value while scanning toward a periphery of the second image from a plurality of pixels set as initial points positioned within a certain range from a center of the second image;

a four-sides-candidates detection unit for creating sides of a quadrangle in respective combinations on the basis of transition points on the assumption that there is a combination of transition points obtained in a one-by-one manner from respective transition point detection lines that are oriented in the same direction and that are members of a group of transition point detection lines that are based on the transition point detection performed in four directions on the second image, the four directions being the two vertical and the two horizontal directions, and detecting as candidates for sides of the quadrangle, from among the sides created in the respective directions, those sides that are closest to the initial points; and a side redetection control unit for determining, on the basis of a quadrangle formed by the four candidate sides that have been detected, whether or not a detected side is a side that has been detected falsely, and performing redetection of candidates for sides when the side is confirmed to be a side that has been detected falsely.

BRIEF DESCRIPTION OF THE DRAWINGS

FIG. 1 shows a configuration of an image region detection program according to the present invention;

FIG. 4A shows the principle of the present invention;

FIG. 5 shows false detection of a side according to the present invention;

FIG. 6 shows an example of a decode process, according to the present embodiment, performed on the codes that are firstly embedded;

FIG. 7 shows a process flow for the code embedded region detection process (S12) according to the present embodiment (example 1);

FIG. 8 shows a process flow of the code embedded region detection process (S12) according to the present embodiment (example 2);

FIG. 11 shows an example of a detection of sides according to the present embodiment;

FIG. 12 shows a detailed process flow of the four-side-candidate detection process (S22) according to the present embodiment;

FIG. 15 shows in detail a process flow of the shape verification process (S24) according to the present embodiment;

DESCRIPTION OF THE PREFERRED EMBODIMENTS

Figure 2:
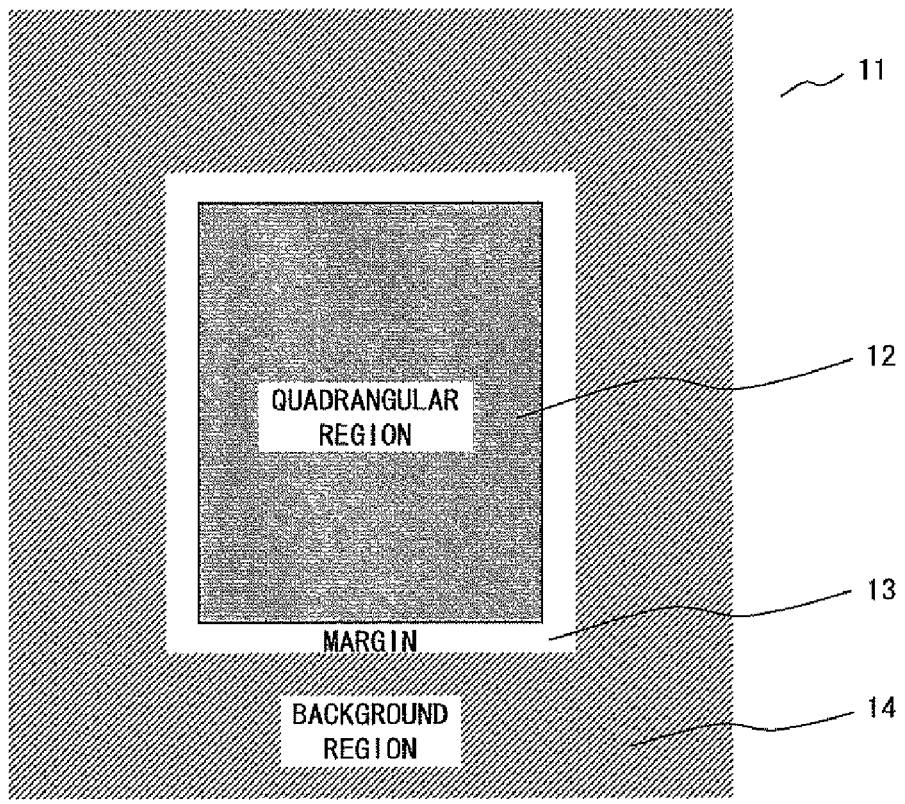
FIG. 2 shows an arrangement on a sheet, the arrangement including an image in which the predetermined region is to be detected according to the present invention.

The image region detection method for detecting a quadrangular region in a second image, the second image being obtained by photographing a quadrangular first image, and the second image including the quadrangular region that is an image region corresponding to the first image in the present invention, n comprises:

detecting one pixel, as a transition point, when the difference in pixel values between adjacent pixels exceeds a threshold value while scanning toward a peripheral region of the second image from a plurality of pixels functioning as initial points positioned within a certain range from a center portion of the second image;

creating sides of a quadrangle in respective combinations on the basis of transition points on the assumption that there is a combination of transition points obtained in a one-by-one manner from respective transition point detection lines that are oriented in the same direction and that are members of a group of transition point detection lines that are based on the transition point detection performed in four directions on the second image, the four directions being the two vertical and the two horizontal directions, and detecting as candidates for sides of the quadrangle, from among the sides created in the respective directions, those sides that are closest to the initial points; and determining, on the basis of a quadrangle formed by the four candidate sides that have been detected, whether or not a detected side is a side that has been detected falsely, and performing redetection of candidates for sides when the side is confirmed to be a side that has been detected falsely.

By the above configuration, it is possible to detect the sides of a quadrangular region by employing transition point detection (edge detection) starting from an inner point of the quadrangular region that is included in an image. Accordingly, even when another quadrangle is arranged on the background region (outside of the target quadrangular region), the target quadrangular region can be detected priorly. Accordingly, the quadrangle that is in the background region will not be erroneously detected. Also, the edge detection can be performed on only a small number of lines in each direction, which enhances the speed of the edge detection.

In the above image region detection method, when the redetection of candidates for sides is performed:

the shape of the quadrangle formed by the four candidates detected for the sides is verified, and thereby it is determined whether or not there is a side that has been detected falsely among the four sides, and when there is a side that has been detected falsely, the side that has been detected falsely is determined; and distinguishing characteristics of the four corners of the quadrangle formed by the four sides are verified, and thereby it is determined whether or not there is a side that has been detected falsely among the four sides, and when there is a side that has been detected falsely, it is determined which side has been detected falsely.

By the above configuration, when the sides are detected, the shape and the four corners of the quadrangle formed by the detected four sides are verified, and the region formed by the four sides that have been determined to be the proper sides via the verification of sides and corners can be handled as the target quadrangular region.

In the above image region detection method, when the redetection of candidates for sides is performed:

when the side that has been detected falsely is determined, a side created on the basis of transition points in a nearest combination that is closer than the side that has been detected falsely, to a periphery of the second image is further detected as the candidate for the side.

By the above configuration, when there is a falsely detected side, the next candidate for the side can be detected.

The above image region detection method further comprises:

detecting coordinates of the four corners of the quadrangle formed by the four sides when there is no side that has been detected falsely.

By the above configuration, the sides that form the quadrangular region are determined, and the intersections of the determined sides can be handled as the coordinates of the four corners.

In the above image region detection method:

when differences in pixel values between adjacent pixels on one and the same transition point detection line are calculated, the differences are calculated in a certain order for each component of respective pixels when the transition points are detected.

By the above configuration, it is possible to enhance the speed of the transition point detection process and the detection efficiency.

In the above image region detection method:

a candidate for a side is an approximate line created on the basis of transition points in the respective combinations, the approximate line is within a certain distance of a tolerance from transition points from which the approximate line was created, and the approximate line is the closest approximate line to the initial point when the candidates for the four sides are detected.

By the above configuration, even when there is a plurality of combinations of transition points (edges) that are in line, the candidates for the sides of the target quadrangular region can be narrowed.

In the above image region detection method:

it is determined whether or not, among the four sides, there is a side that has been detected falsely, this determination being made, in verification of the shape of the quadrangle, on the basis of whether or not an interior angle of the quadrangle formed by the four candidates detected for the sides is within a certain range.

By the above configuration, even when the first image is photographed obliquely such that the quadrangular region in the second image is a trapezoid, the sides that form the quadrangular region can be detected.

In the above image region detection method:

a distinguishing characteristic of each of the four corners of the quadrangle formed by the four sides is a shape of each of the four corners or a certain mark that is provided at each of the four corners of the quadrangular region in order to be used for determining the first image in the verification of the distinctiveness of the four corners.

By the above configuration, it is possible to confirm whether or not the four corners formed by the detected four sides are actually identical to the four corners of the quadrangular region corresponding to the first image.

As described above, in the present invention, the detection of sides in the four directions (vertical and horizontal directions) is performed on the basis of results of edge detection performed on lines having a particular width, starting from an inner point toward the periphery of the quadrangular region in the input image, and the shape and the four corners of the quadrangle formed by the detected four sides are verified. Thereby, when there is a side that has been falsely detected, redetection on sides that are closer to the periphery than the side that has been detected falsely is performed, such that the quadrangular region can be formed at high speed.

FIG. 1 shows a configuration of an image region detection program according to the present invention. The image region detection program 1 detects a region of a quadrangular image in the photographed image. The image region detection program includes the steps of a transition point detection process (S1), a four-sides-candidates detection process (S2), a shape verification process (S3), a four corner verification process (S4), a sides redetection process (S5), a redetection control process (S6), and a four corner coordinate detection process (S7).

In the transition point detection process (S1), transition points (edges) at which the change in pixel values satisfies the predetermined conditions are detected by searching in the four directions (vertical and horizontal directions) toward the periphery from an initial point that is located within a certain range from the center coordinate in the input image.

Also in the transition point detection process (S1), it is possible for components to be selected in the predetermined order at one and the same detection point, and when the transition point is detected, the detection at that point is terminated. Thereby, the transition point detection process is performed until the transition point is detected in order of priority of a plurality of colors of components (color components that constitute pixels).

In the four-sides-candidates detection process (S2), the sides that are the innermost in the respective directions are separately detected on the basis of the detection results of the transition points. Specifically, in the four-sides-candidates detection process (S2), among the combinations of the transition points detected in the respective directions in the transition point detection process (S1), the approximate lines whose distances from the respective coordinates of the transition points are within the prescribed tolerance and which are the closest to the initial point are the candidates for the sides of the quadrangular region (in other words, the sides are determined by combining a plurality of inner transition points). Thereby, it is possible to determine the sides on the basis of the combinations of the plurality of inner transition points obtained.

In the shape verification process (S3), the shape of the quadrangle that consists of the four sides detected in the four sides candidates detection process (S2) is verified. Further, in the shape verification process (S3), it is determined whether there is a false detection of the four sides, and when there is a false detection, the side that has been detected falsely is determined. Specifically, it is determined whether or not the respective four detections are false detections on the basis of whether or not the positions of the corners formed as the intersections between two sides among the four sides detected in the a four sides candidates detection process (S2) and the interior angles of the corners are within certain ranges. Thereby, the side that has been detected falsely can be determined on the basis of the angles of the four corners.

In the four corner verification process (S4), the likelihood of the four corners of the quadrangle formed by the detected four sides being the four corners of the target quadrangle is verified. On the basis of the verification results, it is determined whether or not there is a falsely detected side among the four sides, and when there is a falsely detected side, it is determined which side has been detected falsely. It is possible to determine whether or not there is a side that has been detected falsely, on the basis of, for example, whether or not detections of the four corners of the quadrangle or detections of marks provided for determining the four corners are terminated successfully. Thereby, it is possible to determine the side that has been detected falsely on the basis of the marks provided at the four corners or the likelihood of the corners being the corners of the target quadrangle.

In the sides redetection process (S5), one outer side is newly detected in the direction in which there is a side that has been detected falsely, the new detection being performed on the basis of the determination results of the shape verification process (S3) and the four corner verification process (S4) and the result of the above transition point detection.

In the redetection control process (S6), it is determined whether or not any of the respective sides have been detected falsely, the determination being performed on the basis of the quadrangle formed by the detected candidates for the four sides. When at least one side is determined to be a side that has been detected falsely, detection of the candidates for that one side is again performed. Specifically, the shape verification process (S3), the four corner verification process (S4), and the sides redetection process (S5) are performed until it is confirmed that there is no side that has been detected falsely in the shape verification process (S3) or the four corner verification process (S4).

In the four corner coordinate detection process (S7), a quadrangular region is detected on the basis of the four sides that are finally determined not to include a side that has been detected falsely in the redetection control process (S6).

Hereinbelow, the principle of the present invention will be explained.

FIG. 2 shows an arrangement on a sheet including an image on which the predetermined region is to be detected in the present invention. An input image 11 includes a quadrangular region 12, and around the periphery of the quadrangular region 12, there is a margin 13 having a certain width. Further out than the margin 13, there is a background region 14 on which there is no limitation of design or layout.

Figure 3:
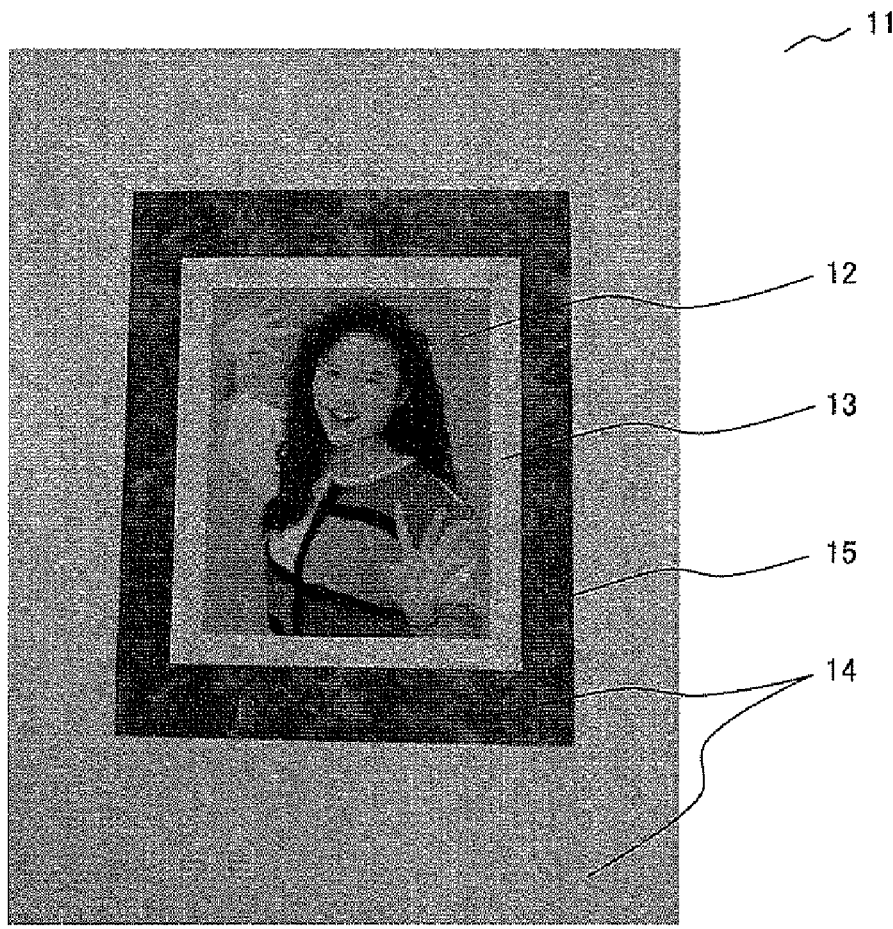
FIG. 3 shows an example of an input image according to the present embodiment.

FIG. 3 shows an example of the input image in the present embodiment (the image is cited from JIS X 9201 CMYK/SCID). The input image 11 that is obtained by photographing the sheet shown in FIG. 3 includes the quadrangular region 12 on which the region is to be detected, the margin 13, and the background region 14. When a quadrangle 15 enclosing the quadrangular region 12 is included in the background region 14, the conventional detection methods cause a false detection detecting that the background region (the quadrangular region denoted by numeral 15) is the quadrangular region that is the detection target.

Figure 4B:
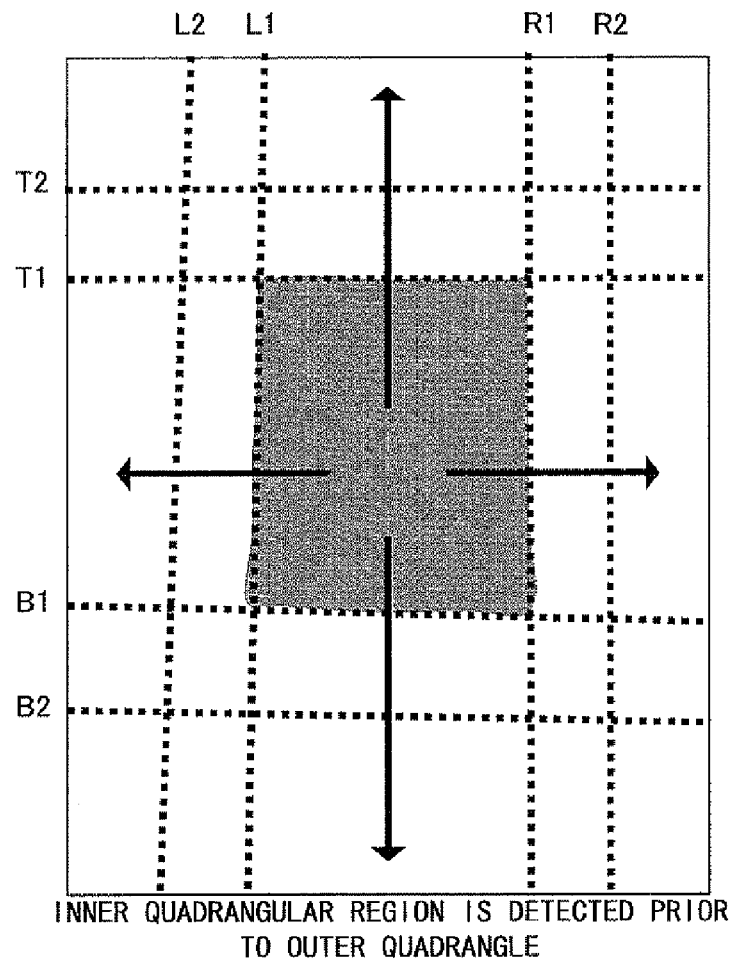
FIG. 4B shows the same sample as shown in FIG. 4A in a simplified manner.

FIG. 4A shows the principle of the present invention. FIG. 4B shows the same sample as that shown in FIG. 4A in a simplified manner. FIG. 5 shows the false detection of a side. In the present invention, the side detection is performed from an inner point in the quadrangular region 12 by employing the edge detection as shown in FIGS. 4A and 4B; accordingly, even when the background region 14 includes the quadrangle 15, the proper quadrangular region 12 can be detected prior to the detection of the quadrangle 15, such that it is possible to avoid falsely detecting quadrangle 15 as the detection target.

Also, when the detection of sides is performed from an inner point toward the periphery in the quadrangular region 12, a false detection of a side that is not a side of the quadrangular region may be caused, depending on patterns of the image, as shown in FIG. 5.

Thus, when sides are detected, the shape of the quadrangle formed by the detected four sides and the corners formed by the detected four sides are verified. When the detected sides are determined to be the proper sides through the above two kinds of verification, the region formed by the four sides is handled as a provisional quadrangular region. If a side is determined to have been detected falsely, the next candidate for the side that is closer to the periphery of the input image than the side that has been detected falsely is detected such that the quadrangle is modified. Thereby, the false detection is not caused in the inner or outer portion of the target quadrangular region such that the coordinates of the four corners can be detected properly.

Next, the transition point detection process (S1), the shape verification process (S3), the four corner verification process (S4), and the sides redetection process (S5) serving as the constituent elements of the redetection control function are explained in more detail.

First, the transition point detection process (S1) is explained. As described above, in the transition point detection process (S1), the edge detection is performed from an inner point toward the periphery on the image. When it is assumed that there is a difference greater than a certain value between the pixel value of the four sides of the target quadrangular region and the pixel value of the margin, the positions of the four sides can be determined by employing the edge detection method in which the difference between the value of the pixel of interest and the value of the pixel around the pixel of interest is obtained.

However, when the edge detection is performed on all the pixels on the input image, a large amount of calculation is required. In the conventional technique, the edge detection has been performed only on a small number of lines from the periphery of the input image, and when the edge is detected, the detection direction is changed, and the edge detection is performed along the detected edge in order to determine the side. This method allows high speed processing if the number of detection of edges performed before reaching the four sides is small. However, when the edge detection is performed from an inner point toward the periphery, patterns in the target quadrangular region are detected as edges, and the number of edge detection increases, such that process speed is reduced.

Thus, in the present invention, the edge detection is performed only on the small number of lines (five lines, for example) that are in each search direction when the edge detection is performed from an inner point in the four directions (vertical and horizontal directions) in order to realize a high speed edge detection.

Next, the four-sides-candidates detection process (S2) is explained. There is a difference greater than a certain value between the value of the pixels constituting the margin and the value of each of the pixels constituting the four sides of the target quadrangular region; accordingly, the edge can be detected no matter which point on the sides the edge detection is performed at.

Thus, a combination of the edges whose coordinates are approximately in line are selected from among the combinations of the edges that have been extracted in a one-by-one manner from the plurality of lines. Then, the proper combinations of the edges on the four sides of the quadrangular region are formed even in the case when there is a plurality of combinations of edges that are in line. Thereby, it is possible to narrow the candidates for the sides of the quadrangular region on the basis of the edge detection result.

Next, the shape verification process (S3) is explained. When the four sides detected in (S2) are proper, the angles of the four corners formed by the four sides are within the range of distortion of the trapezoid that is assumed in the case when a quadrangular image is photographed with a camera. Accordingly, it is verified whether or not the angles of the four corners are within the tolerance range, and when the angles are out of the tolerance range, the side that has the highest probability of having been falsely detected is determined.

Specifically, when there is one side having two corners whose angles are both out of the tolerance range, that side is determined to be the side that has been detected falsely. When there are two sides that each have one or two corners whose angles are out of the tolerance, the side whose angle with respect to the opposite side is larger is determined to be the side that has been detected falsely. When there is an angle that is out of the tolerance range and any one of the above two conditions are not satisfied, it is assumed that the quadrangular region has been photographed uninclined with respect to the input image, and the side whose angle with respect to one of the four sides of the input image is the largest is determined to be the side that has been detected falsely. Thereby, the side that has been detected falsely is accurately determined, and the detection accuracy of the quadrangular region is enhanced.

Next, the four corner verification process (S4) is explained. Distinguishing characteristics of the four corners (the shapes of the four corners and the like) of the quadrangular region formed by the detected four sides or the presence/absence of the mark indicating the positions of the four corners is verified. When there is a false detection, the verification of the corner formed by the side that has been detected falsely fails. Then, the side having the corners whose verification failed is determined to be the side that has been detected falsely. By accurately determining the side that has been detected falsely, the detection accuracy of the quadrangular region is enhanced.

Next, the sides redetection process (S5) is explained. FIG. 5 shows a quadrangular region formed by T1, B1, L1, and R1. When the side R1 that has been detected falsely is determined in the shape verification process (S3) and four-corner verification process (S4), the side R2 that is in the same direction as the edge detection line on which the edge of the origin of the side that has been detected falsely is detected and that is next to the side that has been detected falsely in the direction toward the center is handled as the new candidate for the side. In this manner, the new quadrangular region formed by T1, B1, E1, and R2 is detected. Thereby, coordinates of the four corners can be detected without causing a false detection of a quadrangle inside the target quadrangular region.

Hereinbelow, an embodiment is explained in which the quadrangular region in which codes are embedded is properly detected without detecting a quadrangle that is arranged on the background region.

FIG. 6 shows an example of a decode process, in the present embodiment, performed on the codes that are firstly embedded. A CPU (Central Processing Unit) reads an image region detection program from a recording unit in a computer in which the recording unit records the image region detection program, and executes the process in the flowchart shown in FIG. 6.

Electrical image data is created by photographing, with a camera, a scanner, or the like, an image in which codes are embedded. In an image obtainment process (S11), the photographed image is obtained as an input image.

Next, in a code embedded region detection process (S12), the coordinates of the four corners of a quadrangular region of an image in which prescribed codes are embedded are determined for the input image while following the process flow.

In an embedded code read process (S13), the embedded codes are extracted from the rectangular image on the basis of the coordinates of the four corners.

Next, a detailed process flow (examples 1 and 2) for the code embedded region detection process (S12) is explained by referring to FIGS. 7 and 8.

FIG. 7 shows a process flow for the code embedded region detection process (S12) in the present embodiment (example 1). First, in (S11), the transition point detection (edge detection) is performed in the four directions (vertical and horizontal directions) on the image data obtained in (S11). The candidates for the four sides are detected on the basis of the detected transition points (edges) (S22).

Next, a redetection control process (S23) is performed. In the redetection control process (S23), the processes performed in (S24) through (S28) are controlled. The redetection control process (S23) is explained in detail hereinbelow.

First, the shape of the quadrangle formed by the candidates for the four sides detected in (S22) is verified (S24). When a false detection is determined in (S24) (Yes in S25), the redetection of sides is performed (S28), and the shape is again verified (S24). When it is determined in (S24) that the shape of the quadrangle is proper and that there is no false detection (No in S25), the four corners are verified (S26).

When a false detection is determined to have occurred in verification of the four corners (S26) (Yes in S27), the redetection of sides is performed (S28). The processes of S24 through S27 are repeated until it is determined that there is no side that has been detected falsely.

FIG. 8 shows a process flow chart of the code embedded region detection process (S12) in the present embodiment (example 2). This flowchart is the flowchart shown in FIG. 8 to which a four-corners-coordinates (intersections between four sides) detection process (S29) is added. When it is determined that there is no side that has been detected falsely (No in S27), the coordinates of the four corners at that moment are determined to be the coordinates of the four corners of the quadrangular region.

Next, the respective processes in the flowcharts shown in FIGS. 7 and 8 are explained.

[Transition Point Detection in Four Directions (S21)]

Figure 9:
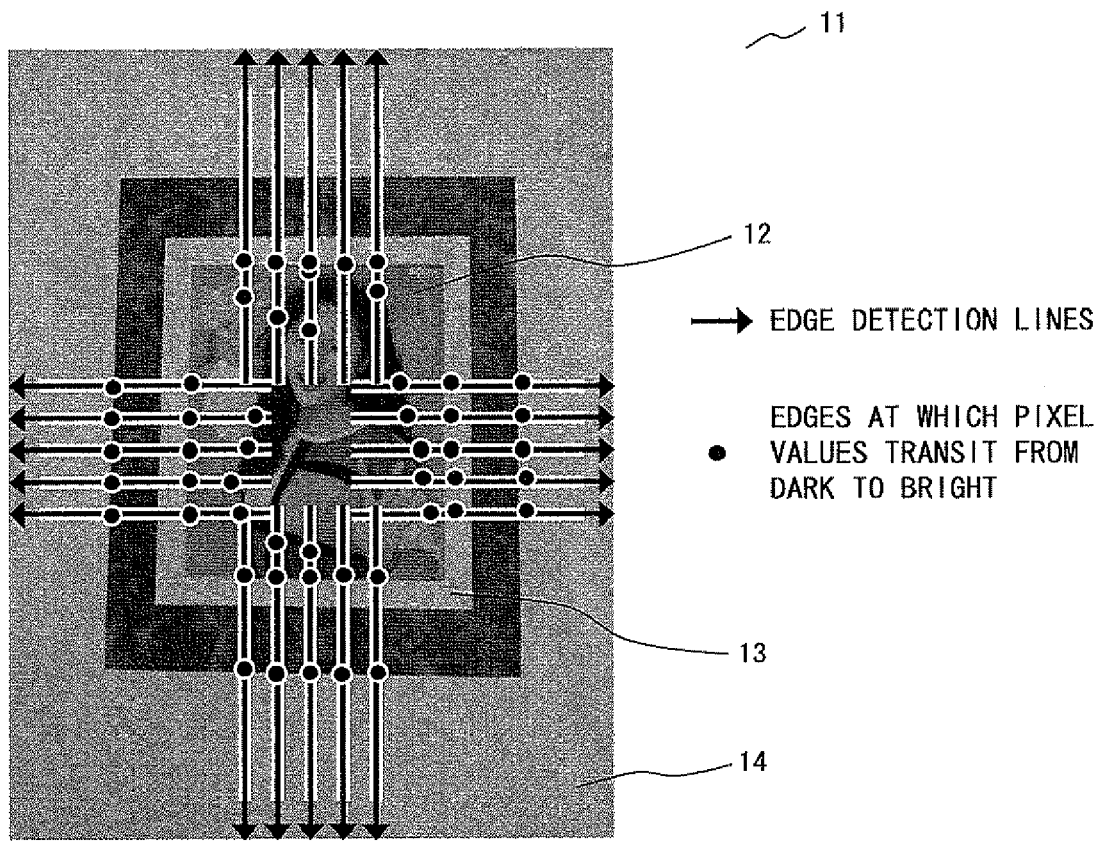
FIG. 9 shows an example of the transition point detection according to the present embodiment.

FIG. 9 shows an example of the transition point detection in the present embodiment. When the difference in pixel values between the pixel at the search point (the pixel at the point on which the edge detection is currently being performed) and a pixel around the search point exceeds a certain threshold value, the pixel at that search point is handled as the transition point (edge) by utilizing the fact that there is a difference in pixel values between the four sides of the quadrangular region 12 and the margin 13 around the quadrangular region 12. In FIG. 9, the filled circles on the edge detection lines denote the edges (transition points) at which the pixel value changes from "dark" to "bright".

The transition point detection (edge detection) is performed in the four directions from an inner point on the quadrangular region 12 toward the periphery of the input image 11. For example, a region around the center of the input image 11 is set as the initial coordinates for the edge detection in the four directions on the assumption that the quadrangular region 12 surrounds the center of the input image 11. This edge detection is performed on, for example, five lines in each of the four directions (vertical and horizontal directions), as shown in FIG. 9.

It is also possible to detect only the edges that include flat pixels whose width is smaller than that of the margin 13 being assumed in the input image 11 (in other words, only the edge being detected and having thereafter the region of a prescribed width in which there is almost no difference in the pixel values between the pixel being in the searched position and another pixel around it), in order to accurately perform detection by reducing the number of edges detected.

Figure 10:
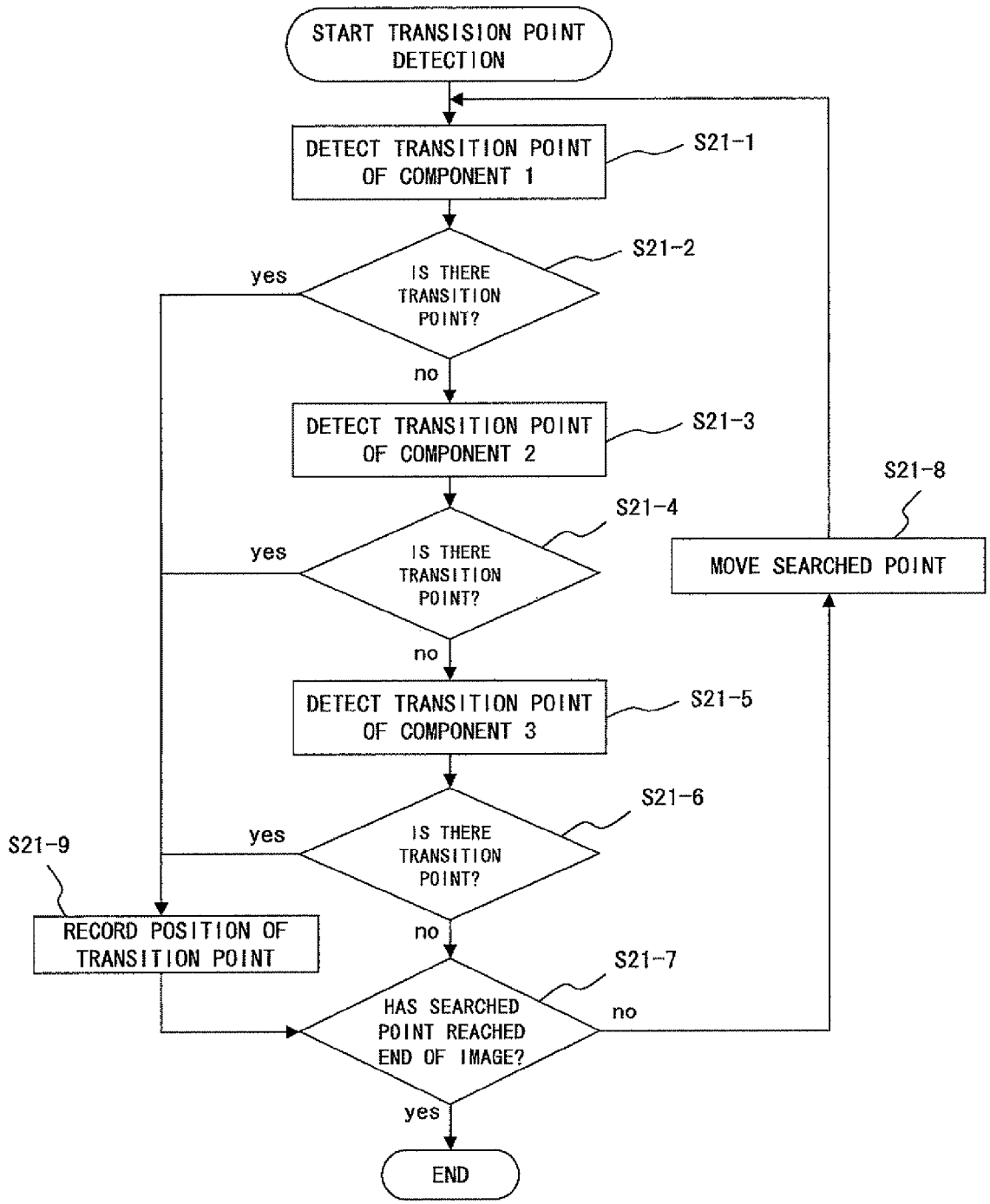
FIG. 10 shows another example of the transition point detection according to the present embodiment (in a case of which there are three components)

FIG. 10 shows another example of the transition point detection in the present embodiment (in a case in which there are three components). According to this example, it is possible to enhance the processing speed of the transition point detection and the detection efficiency.

Each pixel consists of the three components, R (red), G (green), and B (blue). Thus, in the process flow shown in FIG. 10, transition points (edges) are detected for each component. For the convenience of the explanation on this flowchart, it is assumed that the coordinate of the pixel that is the target of a search is X1 (x, y), and the coordinate of the pixel next to this pixel is X2 (x−1, y) on, for example, the edge detection line to the right direction.

First, the transition point (edge) of component 1 of X1 and X2 is detected (S21-1). In the detection of the transition point (edge), when the difference in the pixel values of component 1 exceeds a certain threshold value, the pixel at that moment is handled as the transition point (edge).

When the transition point is detected in S21-1, in other words, when the difference in the pixel values between component 1 of X1 and component 1 of X2 exceeds the threshold value (Yes in S21-2), the position of that transition point is recorded (S21-9). Thereafter, the process proceeds to S21-7.

When the transition point is not detected in S21-1—in other words, when the difference in the pixel values between component 1 of X1 and component 1 of X2 does not exceed the threshold value (No in S21-2)—the transition points (edges) of component 2 of X1 and of component 2 of X2 are detected (S21-3).

When the transition point is detected in S21-3—in other words, when the difference in the pixel values between component 2 of X1 and component 2 of X2 exceeds the threshold value (Yes in S21-4)—the position of that transition point is recorded (S21-9). Thereafter, the process proceeds to S21-7.

When the transition point is not detected in S21-3—in other words, when the difference in the pixel values between the component 2 of X1 and the component 2 of X2 does not exceed the threshold value (No in S21-4)—the transition points (edges) of component 3 of X1 and component 3 of X2 are detected (S21-5).

When the transition point is detected in S21-5—in other words, when the difference in the pixel values between component 3 of X1 and component 3 of X2 exceeds the threshold value (Yes in S21-6)—the position of that transition point is recorded (S21-9). Thereafter, the process proceeds to S21-7.

When the transition point is not detected in S21-5—in other words, when the difference in the pixel values between component 3 of X1 and component 3 of X2 does not exceed the threshold value (No in S21-6)—it is determined whether or not the searched point (i.e., the position of X1) has reached the end of the input image 11 (S21-7).

When it is determined in S21-7 that the searched point (the position of X1) has not reached the end of the input image 11 (No in S21-7), the searched point X1 is moved by 1 pixel to the right direction along the edge detection line, such that X1 is (x+1, y) and X2 is (x, y). The process of S21-1 is again performed on the new X1 and X2.

When it is determined in S21-7 that the searched point (the position of X1) has reached the end of the input image 11 (Yes in S21-7), this process flow is terminated.

[Four Side Candidate Detection Process (S22)]

FIG. 11 shows an example of a detection of sides in the present embodiment. The coordinates detected by the edge detection on five lines to the right direction are thought to be approximately in line along a side as shown in FIG. 9, when the coordinates are close to a side of the quadrangular region.

Accordingly, the coordinates of the transition points (edge coordinates) detected on the respective edge detection lines in the respective directions are combined, the approximate line is calculated from the coordinates of the transition points of the combination by employing the least-square method, and another approximate line whose transition point coordinates are closer to the approximate line than the certain distance is detected as a candidate for a side.

When there is a plurality of candidates for the right side as shown in FIG. 11, the priority order is determined, starting from the candidate closest to the initial point of the edge detection as R1, R2, and R3, and R1 is employed as the right side of the quadrangular region.

The above processes are performed in the four directions (vertical and horizontal directions), such that four sides are detected as the upper, lower, left, and right sides. Thereby, the provisional quadrangular region is detected. This process is explained by referring to FIGS. 11 and 12.

Figure 13:
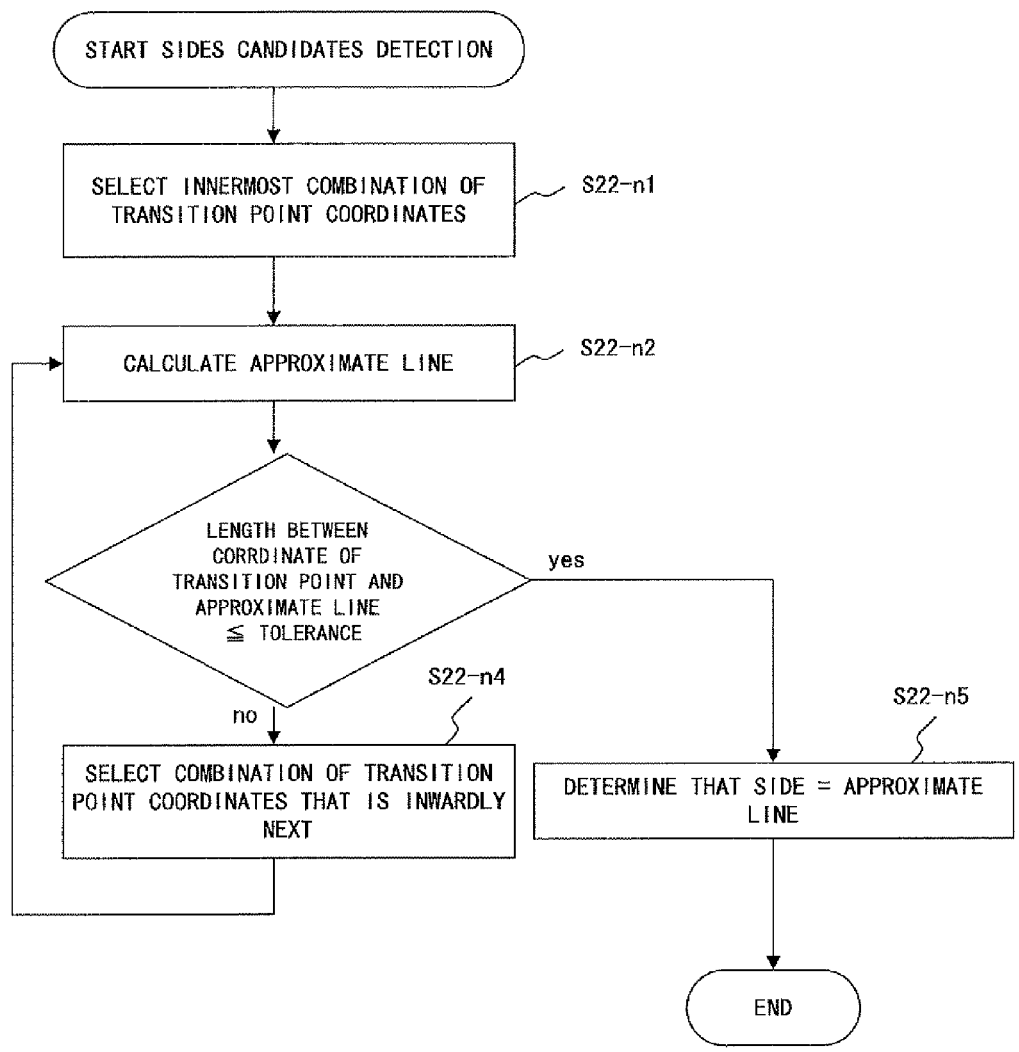
FIG. 13 shows in more detail the side-candidate detection process on the respective sides shown in FIG. 12.

FIG. 12 shows a detailed process flow of the four side candidate detection processes (S22) in the present embodiment. In FIG. 12, the detection of candidates for sides shown in FIG. 13 is performed on the upper, lower, left, and right sides (S22-1, S22-2, S22-3, and S22-4). These processes of S22-1 through S22-4 can be performed in an arbitrary order.

FIG. 13 shows in more detail the side candidate detection process on the respective sides shown in FIG. 12. First, the coordinates of the innermost transition point (the closest transition point to the center of the input image 11) is acquired among the combinations of the coordinates of the transition points detected in the respective directions, and the combination of these coordinates of the transition points is selected (S22-$n$1, where n=1 through 4).

Next, the approximate line is calculated from the selected combination of the coordinates of the transition points by employing the least-square method (S22-$n$2).

Next, it is determined whether or not the length between each of the coordinates of the transition point and the approximate line is within the tolerance range (S22-$n$3). When the length between each of the coordinates of the transition points and the approximate line>the tolerance range (No in S22-$n$3), the combination of the coordinates of the transition points that are next to the current combination on the side closest to the center are selected (S22-$n$4), and the process in S22-$n$2 is performed. When the combination of the coordinates of the transition points is selected, a new set of coordinates of the transition points can be selected by replacing the coordinates of the transition points that satisfy "length between each of the coordinates of the transition points and approximate line>tolerance range" with the coordinates of the transition points on the same edge detection line that is next to the current transition point on the side closest to the center (in other words, a new combination of transition points is created by replacing each of the coordinates). In addition, a combination of the coordinates of the transition points that are next to (on the side closest to the center) the coordinates of a set of the transition points that served as the origin of the approximate line can be the new set of coordinates (in other words, the approximate line is created by replacing each of combinations that are currently selected).

When each of the coordinates of the transition points≦tolerance range (Yes in S22-n3), the approximate line is determined to be the candidate for a side (S22-n5).

[Shape Verification Process (S24)]

Figure 14:
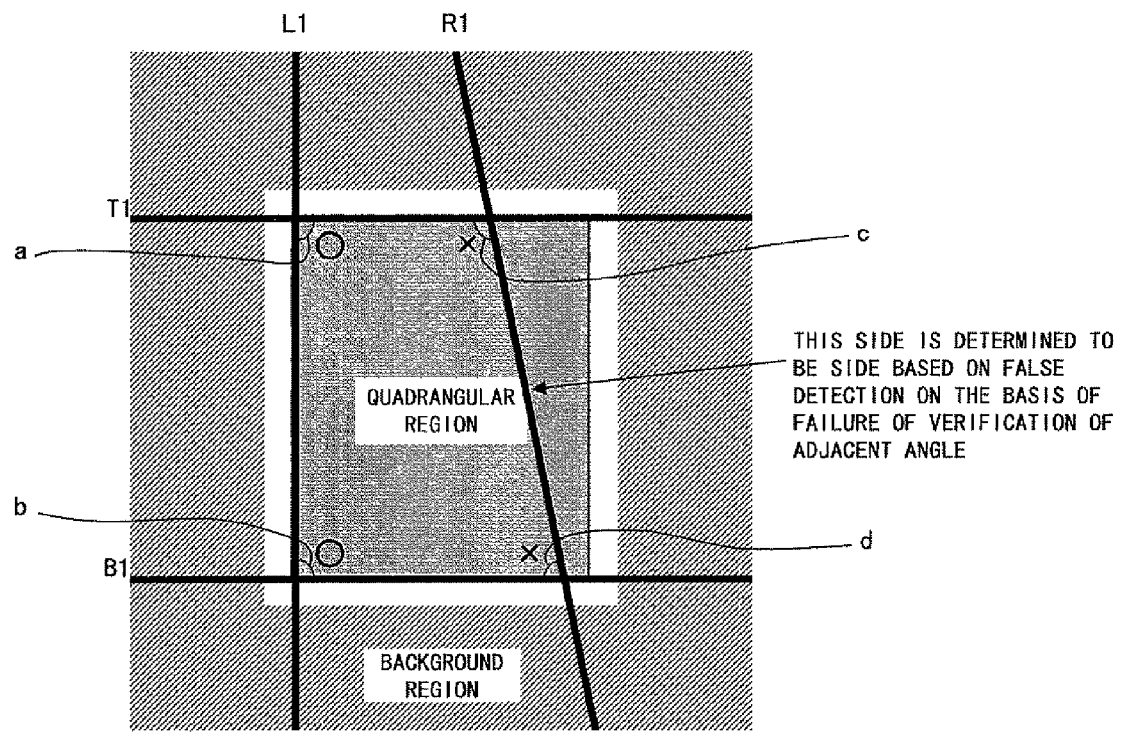
FIG. 14 shows an example of shape verification according to the present embodiment.

FIG. 14 shows an example of shape verification in the present embodiment. In the shape verification process (S24), the angles a, b, c, and d of the four corners formed by the sides T1, B1, L1, and R1 forming the provisional quadrangular region are obtained.

It is assumed that the range of variations (which are caused by an inclination of the camera with respect to the image photographed by the camera) of the angle (which should be 90 degrees) of each of the corners of the image in which the codes are embedded is between, for example 80 degrees and 100 degrees. On the basis of this assumption, if the angle at the intersection between the detected sides is within the range between 80 degrees and 100 degrees, that angle is determined to be within the tolerance range of the corners of the quadrangular region that satisfies the requirement of the shape verification.

When there is an angle that is not within the tolerance range, the angle verification is determined to have failed, and it is determined that one of the two sides including the angle is a side that has been detected falsely.

Further, when the angle verification on another angle fails and there is a side that is common for those two angles, that side is determined to be a side that has been detected falsely.

When there is an angle for which the verification fails and the candidates for the angle that has been detected falsely cannot be narrowed, the side that has the highest probability of being the side that has been detected falsely is determined on the basis of the parallelism against the opposite side and the parallelism against the input image. Thereafter, the detection is again performed.

In FIG. 14, the angle a formed by L1 and T1, and the angle b formed by L1 and B1 are within the tolerance range of a quadrangle, thus the angle verifications on these angles are successful. In contrast, the angle c formed by T1 and R1, and the angle d formed by B1 and R1 are not within the tolerance, thus the R1 is determined to be a side that has been detected falsely because the angle verification on the angle included in that side failed. This process is explained by referring to FIG. 15.

FIG. 15 shows in detail a process flow of the shape verification process (S24) according to the present embodiment. First, the angles of the four corners of the quadrangle formed by the four sides are calculated (S24-1).

Next, it is determined whether all the angles of the four corners are within the tolerance range, or whether there are two angles that are not included in one side and that are out of the tolerance range (condition 1-1). When condition 1-1 is satisfied (Yes in S24-2), it is determined that there has been no false detection (S24-6).

When condition 1-1 is not satisfied (No in S24-2), it is determined whether there are two angles that are included in one side and that are out of the tolerance range (condition 1-2). When condition 1-2 is satisfied (Yes in S24-3), the corresponding side is determined to be a side that has been detected falsely (S24-7).

When condition 1-2 is not satisfied (No in S24-3), it is determined whether there is one or three angles that are out of the tolerance (condition 1-3) (S24-4). When condition 1-3 is satisfied (Yes in S24-4), a side that has been detected falsely is determined on the basis of the calculation of the angle with respect to the opposite side (S24-8). Specifically, the side that has the highest probability of being that has been detected falsely is determined on the basis of the parallelism against the opposite side (when the angle against the opposite side is greater than a prescribed angle).

When condition 1-3 is not satisfied (No in S24-4), it is determined whether all the angles are out of the tolerance range (condition 1-4) (S24-5). When condition 1-4 is satisfied (yes in S24-5), the side that has been detected falsely is determined by the calculation of the angle of the input image (S24-9). Specifically, the side that has the highest probability of being a falsely detected side is determined on the basis of the parallelism respectively against the sides forming the quadrangle and the sides forming the frame of the input image.

When condition 1-4 is not satisfied (No in S24-5), or when the processes of S24-6 through S24-9 are terminated, this process flow is terminated.

[Four Corner Verification (S26)]

Figure 16:
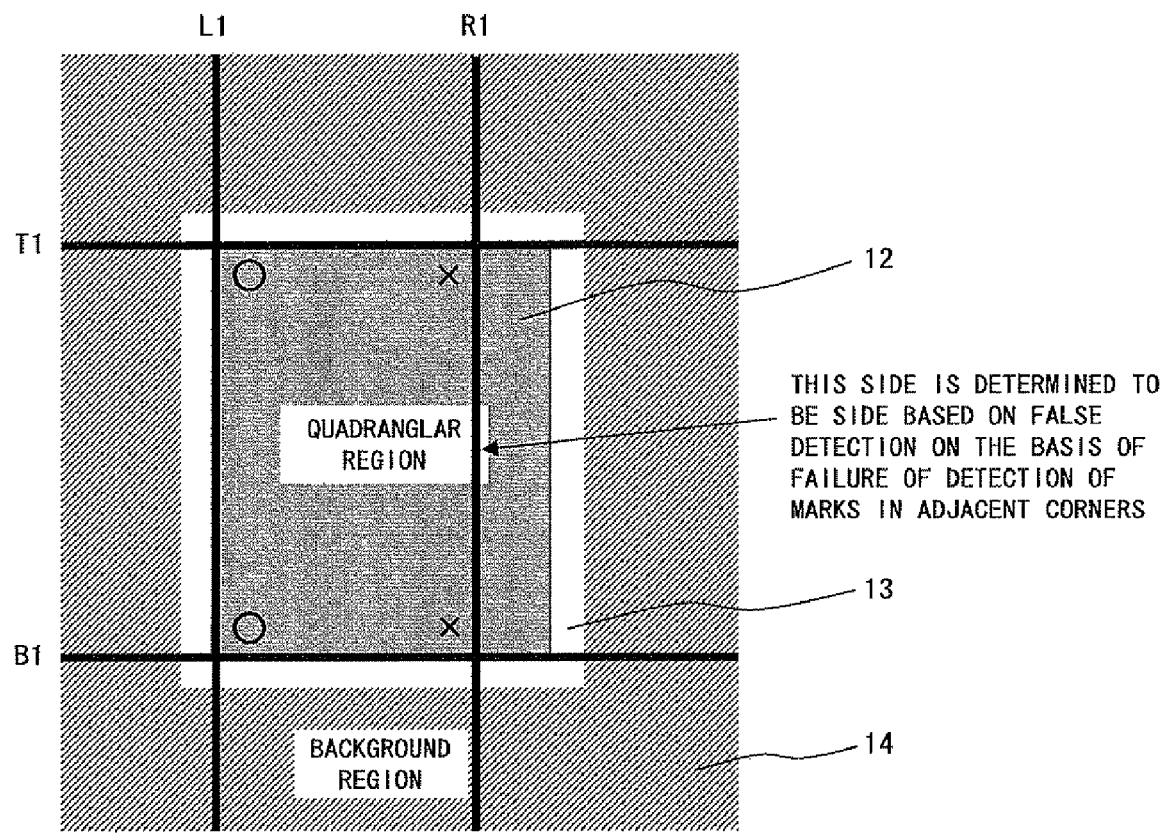
FIG. 16 shows an example of the verification of four corners according to the present embodiment.

FIG. 16 shows an example of the verification of the four corners according to the present embodiment. By verifying the four corners, it is determined that among the four sides, there is a side that has been detected falsely in the quadrangular region 12, and that the quadrangle formed by the four sides is proper.

In the verification of the four corners, the distinguishing characteristics (L-shaped patterns that form the respective corners of the quadrangle, for example) of the quadrangle in which codes are embedded or marks are provided at the four corners are detected.

Figure 17A:
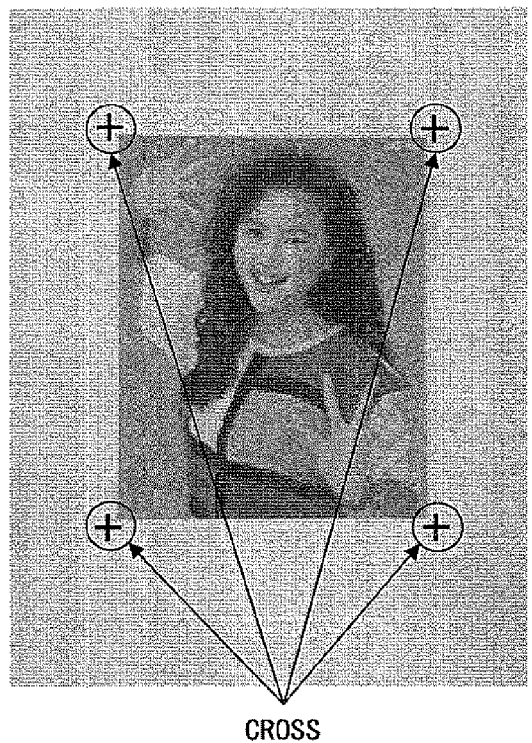
FIG. 17A shows an example (part1) of marks provided at the four corners of the quadrangle according to the present embodiment.
Figure 17B:
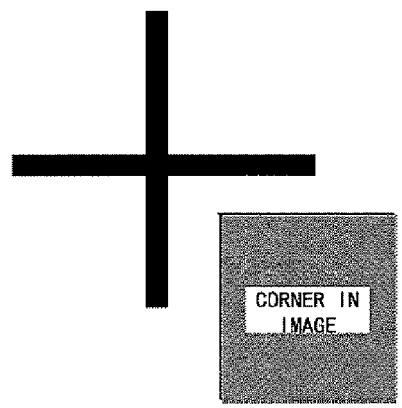
FIG. 17B show an example (part2) of marks provided at the four corners of the quadrangle according to the present embodiment.

FIGS. 17A and 17B show an example of marks provided at the four corners of the quadrangle in the present embodiment. The four corners are verified on the basis of the presence/absence of the distinguishing characteristics such as the crosses shown. When there is a corner that does not have a distinguishing characteristic, the four corner verification is determined to have failed, and one of the two adjacent sides is determined to be the falsely detected side. Further, when the four corner verification of another corner fails and there is a side that is shared by two corners that have been detected falsely, the side is determined to be the side that has been detected falsely. When there is a corner whose verification failed and the side that has been detected falsely can not be determined, the side having the highest probability of being a falsely detected side is determined on the basis of its parallelism against the opposite side and its parallelism against the input image, similarly to the case of the shape verification. Thereafter, side detection is again performed.

Figure 18:
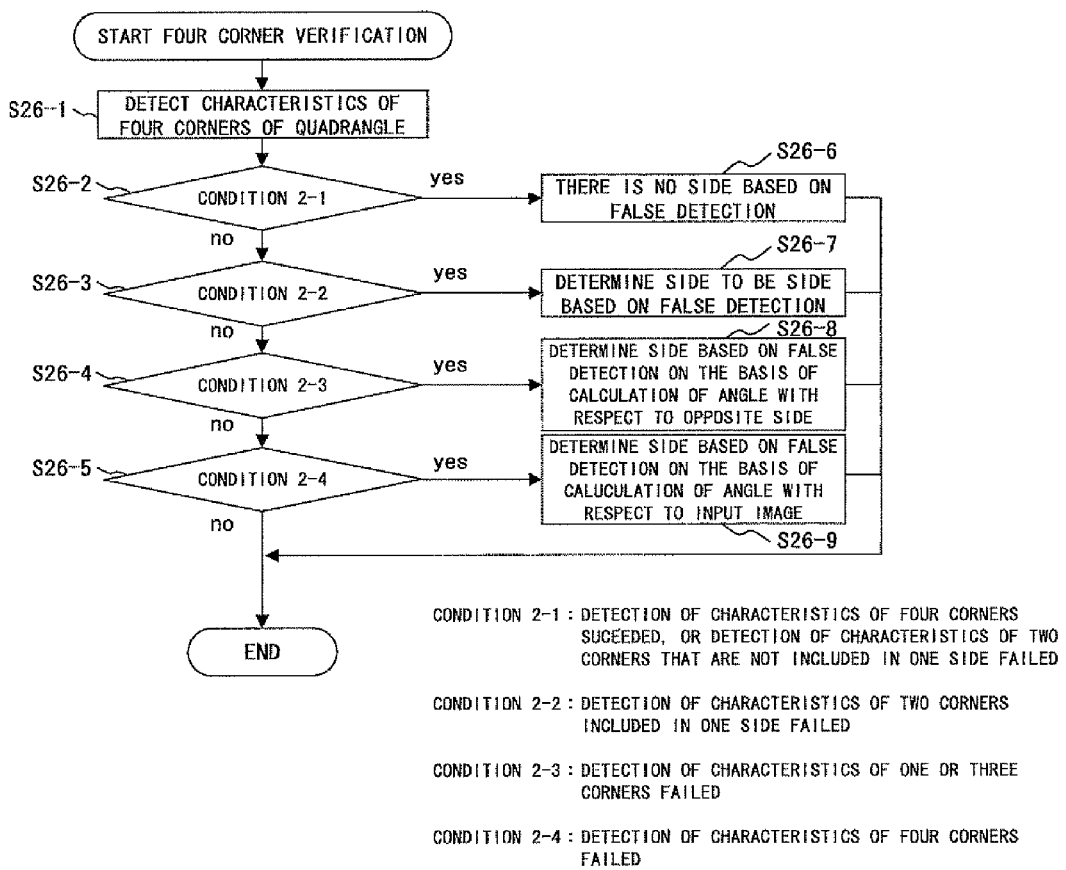
FIG. 18 shows a detailed process flow for four corner verification (S26) according to the present embodiment.

FIG. 18 shows a detailed process flow for the four corner verification (S26) in the present embodiment. First, the distinguishing characteristics of the four corners of the quadrangle are detected (S26-1). This detection of the distinguishing characteristics is performed by, for example, determining whether or not the shape of each corner is L-shaped, or whether or not each of the four corners has a prescribed mark such as a cross (FIG. 17B).

Next, it is determined whether detection of the distinguishing characteristics of the four corners succeeded, or whether the distinguishing characteristics of two corners that are not both included in one side failed (condition 2-1). When condition 2-1 is satisfied (Yes in 26-2), it is determined that there has been no false detection (S26-6).

When condition 2-1 is not satisfied (No in S26-2), it is determined whether the detection of distinguishing characteristics of two corners included in one side failed (condition 2-2). When condition 2-2 is satisfied (Yes in S26-3), the corresponding side is determined to be a side that has been detected falsely (S24-7).

When condition 2-2 is not satisfied (No in S26-3), it is determined whether the detection of distinguishing characteristics of one or three corners failed (condition 2-3) (S26-4). When condition 2-3 is satisfied (Yes in S26-4), the side that has been detected falsely is determined on the basis of the calculation of the angle against the opposite side. Specifically, the side that has the highest probability of having been detected falsely is determined on the basis of its parallelism against the opposite side (when the angle against the opposite side is greater than a prescribed angle).

When condition 2-3 is not satisfied (No in S26-4), it is determined whether the detection of distinguishing characteristics of all the angles failed (condition 2-4) (S26-5). When condition 2-4 is satisfied (Yes in S26-5), the side that has been detected falsely is determined by the calculation of the angle against the input image (S26-9). Specifically, the side that has the highest probability of having been detected falsely is determined on the basis of its parallelism respectively against the sides forming the quadrangle and the sides forming the frame of the input image.

When condition 2-4 is not satisfied (No in S26-5), or when the processes in S26-6 through S26-9 are terminated, the present process flow is terminated.

[Side Redetection Process (S28)]

Figure 19:
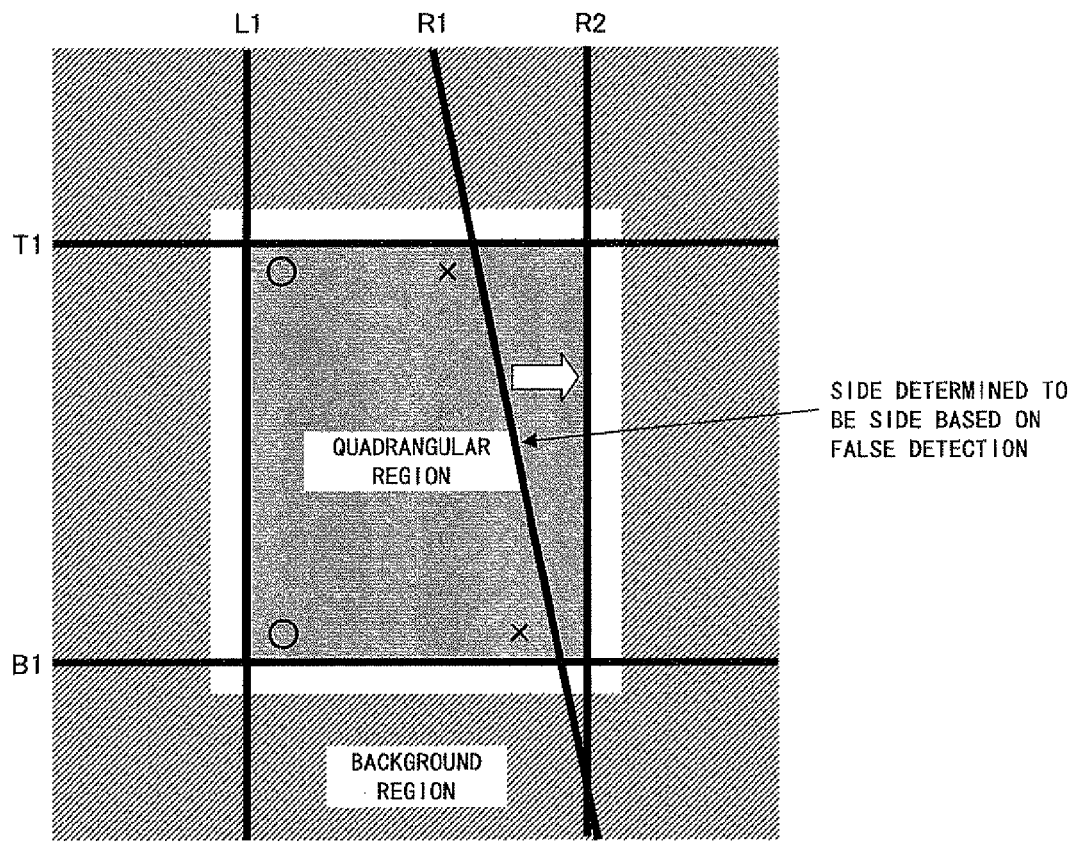
FIG. 19 shows an example of the redetection of sides according to the present embodiment.

FIG. 19 shows an example of the redetection of sides in the present embodiment. As shown in FIG. 19, when it is determined that there is a false detection in the shape verification process (S24) or in the four corner verification (S26) and the side R1 that is the side that has been detected falsely is determined, the side R2 that is closer to the periphery than the side R1 and that is detected by the process of detection of a side next to the side R1 is handled as the new side, and the provisional quadrangle is modified into the quadrangle formed by T1, B1, L1, and R2.

Figure 20:
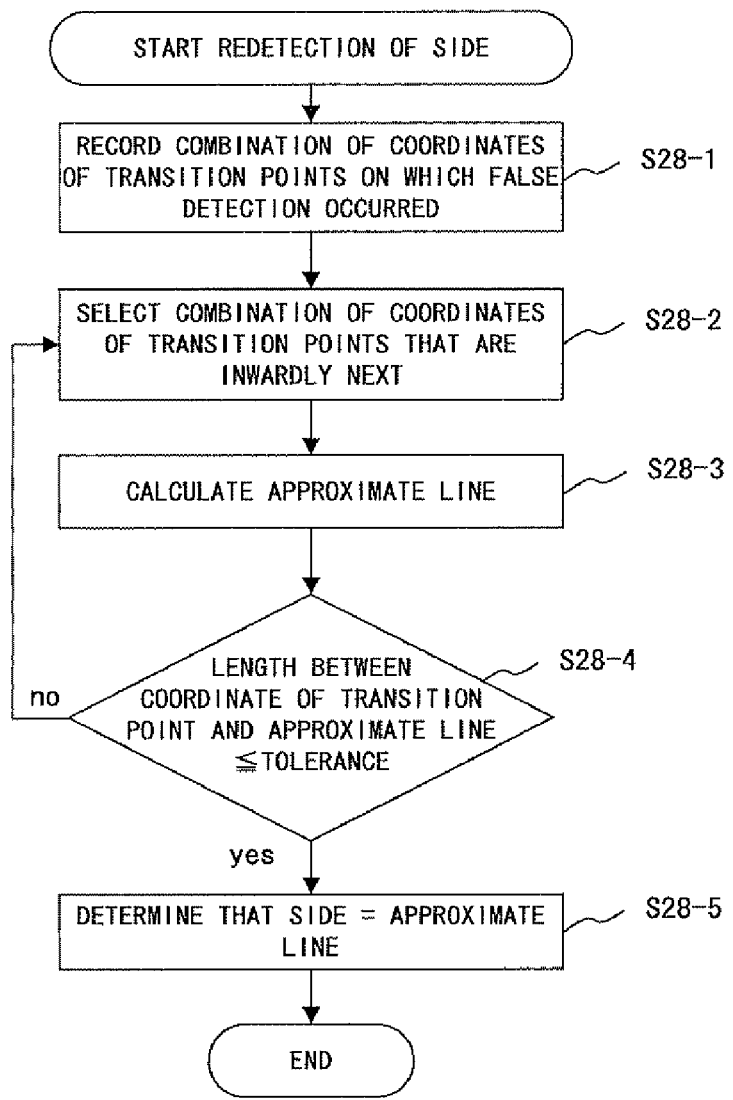
FIG. 20 shows a detailed process flow for a side redetection process (S28) according to the present embodiment.

FIG. 20 shows a detailed process flow for the side redetection process (S28) in the present embodiment. First, the combination of the coordinates of the transition points on which the false detection occurred are recorded (S28-1). Next, the coordinates of the transition points that are on the respective edge detection lines and that are next to (on the side closest to the center) the transition points whose coordinates were recorded in S28-1 are obtained, and a combination of these transition points is selected (S28-2).

Next, the approximate line is calculated from the selected combination of the coordinates of the transition points by employing the least-square method (S28-3).

Next, it is determined whether or not the length between each of the coordinates of the transition points and the approximate line is within the tolerance (S28-4). When the length between each of the coordinates of the transition points and the approximate line>tolerance range (No in S28-4), the combination of the coordinates of the transition points that are next to the current combination on the side closest to the center is selected (S28-2), and the process in S28-3 is performed. When the combination of the coordinates of the transition points is selected, a new single set of the coordinates of the transition points can be selected by replacing the coordinates of the transition points that satisfy "length between each of the coordinates of the transition points and approximate line>tolerance range" with the coordinates of the transition points on the same edge detection line that is next to the current transition point on the side closest to the center; in addition, a combination of the coordinates of the transition points that are next to (on the side closest to the center) the coordinates of a set of the transition points that served as the origin of the approximate line can be the new single set of coordinates of the transition points.

When the length between each transition point coordinate≦tolerance (Yes in S28-4), the approximate line is determined to be the candidate for a side (S28-5).

Figure 21:
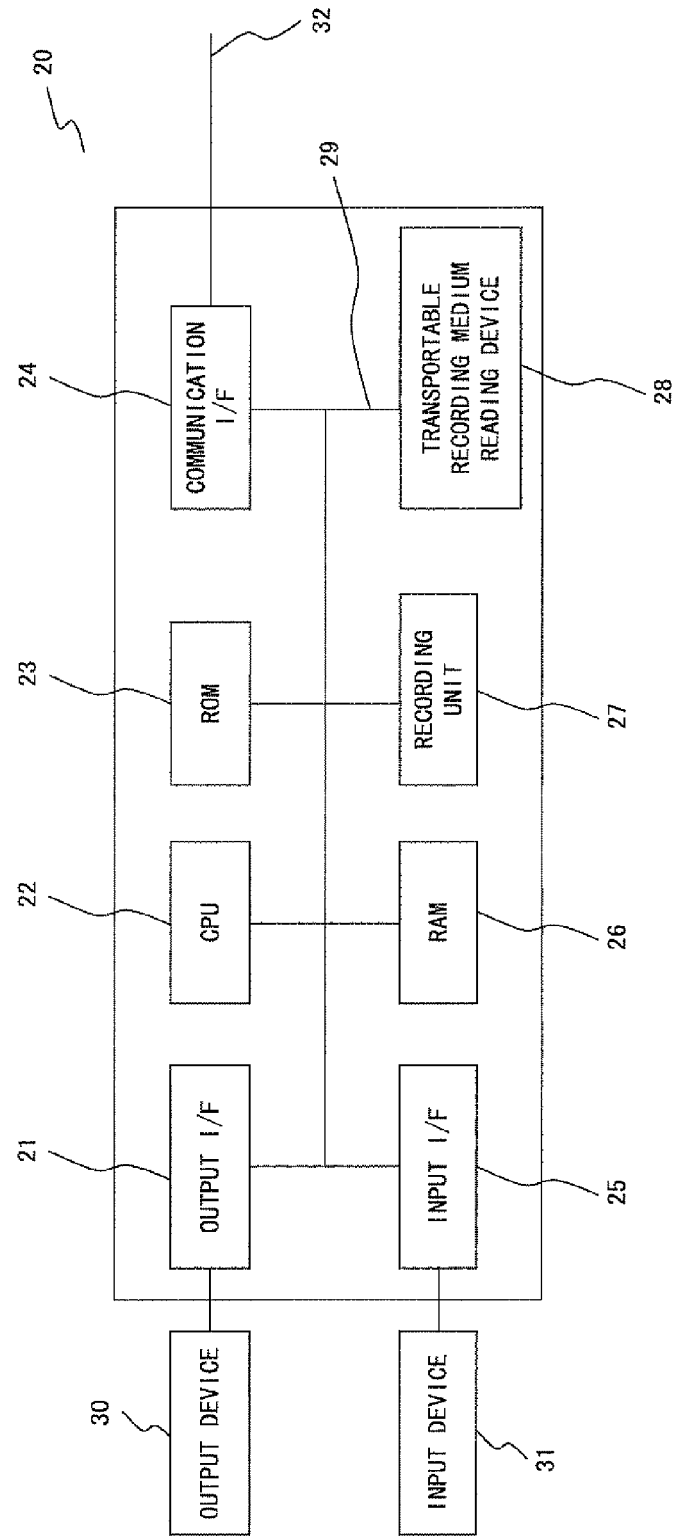
FIG. 21 shows a block diagram of a configuration of computer hardware environment that executes the image region detection program according to the present embodiment.

FIG. 21 shows a block diagram of a configuration of a hardware environment of a computer that executes the image region detection program in the present embodiment. In FIG. 21, a computer 20 includes a CPU 22, a read only memory (ROM) unit 23, a random access memory (RAM) unit 26, a communication interface (hereinafter, referred to as an I/F) 24, a recording unit 27, an output I/F 21, an input I/F 25, a transportable recording medium reading device 28, a bus 29 to which all the above components are connected, an output device 30 connected to the output I/F 21, and an input device 31 connected to the input I/F 25.

As the recording unit 27, various types of recording devices such as a hard disk, a magnetic disk, a flash memory unit and the like can be used. The program based on the above flowcharts explained in the above embodiments are recorded in the recording unit 27 or the ROM unit 23. Also, the threshold values, the patterns used for the shape detection, and the distinguishing characteristics detection used in the above embodiments are recorded in the recording unit 27.

The program according to the present embodiment can be recorded in, for example, the recording unit 27, being provided by a program providing party through a network 32 or the communication I/F 24. Also, this program can be executed by the CPU 22, being recorded in a commercially available transportable recording medium, and read by the transportable recording medium reading device 28. As the transportable recording medium, various types of recording media such as CD-ROM, a flexible disk, an optical disk, a magneto-optical disk, and an IC card can be used, and the program recorded in such a recording medium is read by the transportable recording medium reading device 28.

Also, as the input device 31, a keyboard, a mouse, an electronic camera, a microphone, a scanner, a sensor, a tablet, or the like can be used. Also, as the output device 30, a display device, a printer, a speaker system, or the like can be used. Also, the network 32 can be a communication network such as the Internet, a LAN, a WAN, dedicated lines, a wired network, a wireless network, a public line network, or the like.

According to the conventional techniques of the image region detection method for detecting images in which codes are embedded, region detection fails depending on the designs and arrangements of background regions. However, according to the image region detection method according to the present invention, the target regions can be properly detected without being influenced by designs or arrangements of background regions, such that the degrees of freedom in designing and in the arrangement of the sheet including images in which codes are embedded are enhanced. Also, the lower amount of calculation allows high-speed detection of regions; thus, the present invention can be applied also to devices with low processing capacities such as PDAs (Personal Digital Assistants) or mobile phones.

In the present embodiment, an example has been explained in which a quadrangular region corresponding to the first image in which codes are embedded is detected on the second image. However, the scope of the present invention is not limited to this example, and the first image does not have to include the codes embedded therein when distinguishing characteristics of the four corners are used for the detection of the first image.

The scope of the present invention is not limited to the above embodiments, and various configurations and forms may be employed without departing from the spirit of the present invention.

By applying the present invention, even when the quadrangle that has to be detected is included in another quadrangle, it is possible to properly detect the inner quadrangle that is the detection target. Also, by applying the present invention, even devices that have low processing capacities such as mobile terminals can detect the coordinates of the four corners at high speed.

What is claimed is:

1. An image region detection method for detecting a quadrangular region in a second image, the second image being obtained by photographing a quadrangular first image, and the second image including the quadrangular region that is an image region corresponding to the first image, comprising:

detecting one pixel, as a transition point, when a difference in pixel values between adjacent pixels exceeds a threshold value while scanning toward a periphery of the second image from a plurality of pixels set as initial points positioned within a certain range from a center of the second image;

creating sides of a quadrangle in respective combinations on the basis of transition points on the assumption that there is a combination of transition points obtained in a one-by-one manner from respective transition point detection lines that are oriented in the same direction and that are members of a group of transition point detection lines that are based on the transition point detection performed in four directions on the second image, the four directions being the two vertical and the two horizontal directions, and detecting as candidates for sides of the quadrangle, from among the sides created in the respective directions, those sides that are closest to the initial points; and determining, on the basis of a quadrangle formed by the four candidate sides that have been detected, whether or not a detected side is a side that has been detected falsely, and performing redetection of candidates for sides when the side is confirmed to be a side that has been detected falsely.

2. The image region detection method according to claim 1, wherein, in the case when the redetection of candidates for sides is performed:

a shape of quadrangle formed by the four candidates detected for the sides is verified, and thereby it is determined whether or not there is the side that has been detected falsely among the four sides, and when there is the side that has been detected falsely, the side that has been detected falsely is determined; and distinguishing characteristics of the four corners of the quadrangle formed by the four sides are verified, and thereby it is determined whether or not there is the side that has been detected falsely among the four sides, and when there is the side that has been detected falsely, the side that has been detected falsely is determined.

3. The image region detection method according to claim 2, wherein, in the case when the redetection of candidates for sides is performed:

when the side that has been detected falsely is determined, a side created on the basis of transition points in a nearest combination that is closer than the side that has been detected falsely, to a periphery of the second image is further detected as the candidate for the side.

4. The image region detection method according to claim 1, further comprising:

detecting coordinates of four corners of the quadrangle formed by the four sides when there is no side that has been detected falsely.

5. The image region detection method according to claim 1, wherein:

in the case when differences in pixel values between adjacent pixels on one and the same transition point detection line are calculated, the differences are calculated in certain order for each of components of respective pixels when the transition points are detected.

6. The image region detection method according to claim 1, wherein:

a candidate for a side is an approximate line created on the basis of transition points in the respective combinations, the approximate line is within a certain distance of a tolerance from transition points from which the approximate line was created, and the approximate line is the closest approximate line to the initial point when the candidates for the four sides are detected.

7. The image region detection method according to claim 2, wherein:

it is determined whether or not, among the four sides, there is the side that has been detected falsely, this determination being made, in verification of the shape of the quadrangle, on the basis of whether or not an interior angle of the quadrangle formed by the four candidates detected for the sides is within a certain range.

8. The image region detection method according to claim 2, wherein:

a distinguishing characteristic of each of the four corners of the quadrangle formed by the four sides is a shape of each of the four corners or a certain mark that is provided at each of the four corners of the quadrangular region in order to be used for determining the first image in the verification of the distinctiveness of the four corners.

9. A recording medium that records an image region detection program for causing a computer to execute a process for detecting a quadrangular region on a second image, the second image being obtained by photographing a quadrangular first image and the second image including the quadrangular region that is an image region corresponding to the first image, comprising:

a transition point detection process for detecting one pixel, as a transition point, when a difference in pixel values between adjacent pixels exceeds a threshold value while scanning toward a periphery of the second image from a plurality of pixels set as initial points positioned within a certain range from a center of the second image;

a four-sides-candidates detection process for creating sides of a quadrangle in respective combinations on the basis of transition points on the assumption that there is a combination of transition points obtained in a one-by-one manner from respective transition point detection lines that are oriented in the same direction and that are members of a group of transition point detection lines that are based on the transition point detection performed in four directions on the second image, the four directions being the two vertical and the two horizontal directions, and detecting as candidates for sides of the quadrangle, from among the sides created in the respective directions, those sides that are closest to the initial points; and a side redetection control process for determining, on the basis of a quadrangle formed by the four candidate sides that have been detected, whether or not a detected side has been detected falsely, and performing redetection of candidates for sides when the side is confirmed to be a side that has been detected falsely.

10. The recording medium according to claim 9, wherein the side redetection control process comprises:
a shape verification process for determining whether or not there is the side that has been detected falsely among the four sides on the basis of the shape of the quadrangle formed by the four candidates detected for the sides, and determining the side that has been detected falsely when there is the side that has been detected falsely; and
a four corner verification process for determining whether or not there is the side that has been detected falsely among the four sides on the basis of the distinguishing characteristics of the four corners of a quadrangle formed by the four candidates detected for the sides, and determining the side that has been detected falsely when there is a side that has been detected falsely.

11. The recording medium according to claim 10, wherein the side redetection control process further comprises:
a side redetection process for detecting, as a candidate for the side, a side that is created on the basis of transition points in a nearest combination that is closer than the side that has been detected falsely to a periphery of the second image when the side that has been detected falsely is determined.

12. The recording medium according to claim 9, wherein the recording medium further comprises:
a four corner coordinate detection process for detecting coordinates of four corners of a quadrangle formed by the four sides when there is no side that has been detected falsely.

13. The recording medium according to claim 9, wherein:
the transition point detection process calculates, in a certain order, differences in pixel values for each component of pixels when the differences in pixel values between adjacent pixels on the same transition point detection line are calculated.

14. The recording medium according to claim 9, wherein:
in the four-sides-candidates detection process, a candidate for a side is an approximate line created on the basis of transition points in the respective combinations, the approximate line is within a certain distance of a tolerance range from transition points from which the approximate line was created, and the approximate line is the closest approximate line the initial point.

15. The recording medium according to claim 10, wherein:
in the shape verification process, it is determined whether or not there is the side that has been detected falsely among the four sides on the basis of whether or not an interior angle of the quadrangle formed by the four candidates detected for the sides is within a certain range.

16. The recording medium according to claim 10, wherein:
in the four corner verification process, the distinguishing characteristic of the four corners of the quadrangle formed by the four sides is a shape of each of the four corners or a certain mark that is provided at four corners of the quadrangular region in order to be used for determining the first image.

17. An image region detection device for detecting a quadrangular region in a second image, the second image being obtained by photographing a quadrangular first image, and the second image including the quadrangular region that is an image region corresponding to the first image, comprising:
a transition point detection unit for detecting one pixel, as a transition point, when a difference in pixel values between adjacent pixels exceeds a threshold value while scanning toward a periphery of the second image from a plurality of pixels set as initial points positioned within a certain range from a center of the second image;
a four-sides-candidates detection unit for creating sides of a quadrangle in respective combinations on the basis of transition points on the assumption that there is a combination of transition points obtained in a one-by-one manner from respective transition point detection lines that are oriented in the same direction and that are members of a group of transition point detection lines that are based on the transition point detection performed in four directions on the second image, the four directions being the two vertical and the two horizontal directions, and detecting as candidates for sides of the quadrangle, from among the sides created in the respective directions, those sides that are closest to the initial points; and
a side redetection control unit for determining, on the basis of a quadrangle formed by the four candidate sides that have been detected, whether or not a detected side is a side that has been detected falsely, and performing redetection of candidates for sides when the side is confirmed to be a side that has been detected falsely.

18. The image region detection device according to claim 17, wherein the side redetection control unit comprises:
a shape verification unit for determining whether or not there is the side that has been detected falsely among the four sides on the basis of the shape of the quadrangle formed by the four candidates detected for the sides, and determining the side that has been detected falsely when there is the side that has been detected falsely; and
a four corner verification unit for determining whether or not there is the side that has been detected falsely among the four sides on the basis of the distinguishing characteristics of the four corners of a quadrangle formed by the four candidates detected for the sides, and determining the side that has been detected falsely when there is a side that has been detected falsely.

19. The image region detection device according to claim 18, wherein the side redetection control unit further comprises:
a side detection unit for detecting, as a candidate for the side, a side that is created on the basis of transition points in a nearest combination that is closer than a side that has been detected falsely to a periphery of the second image when the side that has been detected falsely is determined.

20. The image region detection device according to claim 17, further comprising:
a four corner coordinate detection unit for detecting coordinates of four corners of the quadrangle formed by the four sides when there is no side that has been detected falsely.

* * * * *